United States Patent
Wu et al.

(10) Patent No.: US 11,147,047 B2
(45) Date of Patent: Oct. 12, 2021

(54) UPLINK TRANSMISSION METHOD, TERMINAL, AND NETWORK SIDE DEVICE

(71) Applicant: HUAWEI TECHNOLOGIES CO., LTD., Guangdong (CN)

(72) Inventors: Yiqun Wu, Shanghai (CN); Xiuqiang Xu, Shanghai (CN); Yan Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/503,589

(22) Filed: Jul. 4, 2019

(65) Prior Publication Data

US 2019/0327727 A1 Oct. 24, 2019

Related U.S. Application Data

(63) Continuation of application No. PCT/CN2017/115662, filed on Dec. 12, 2017.

(30) Foreign Application Priority Data

Jan. 6, 2017 (CN) .......................... 201710011353.5

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0007* (2013.01); *H04L 5/0051* (2013.01);
(Continued)

(58) Field of Classification Search
CPC ........... H04W 72/0413; H04W 72/048; H04W 72/1268; H04L 5/0007; H04L 5/0051; H04L 27/2605
See application file for complete search history.

(56) References Cited

U.S. PATENT DOCUMENTS

2014/0092767 A1 4/2014 Jong-Man
2014/0192767 A1 7/2014 Au et al.
(Continued)

FOREIGN PATENT DOCUMENTS

CN 101868027 A 10/2010
CN 104838713 A 8/2015
(Continued)

OTHER PUBLICATIONS

3GPP TS 36.212 V14.1.0 (Dec. 2016);3rd Generation Partnership Project;Technical Specification Group Radio Access Network;Evolved Universal Terrestrial Radio Access (E-UTRA);Multiplexing and channel coding(Release 14);total 176 pages.
(Continued)

*Primary Examiner* — Eric Myers
(74) *Attorney, Agent, or Firm* — Womble Bond Dickinson (US) LLP

(57) ABSTRACT

This application provides an uplink transmission method, a terminal, and a network side device. The method includes: storing, by a terminal, an uplink transmission time-frequency resource allocated by a network side device; when the terminal needs to send an uplink signal, determining the to-be-transmitted uplink signal based on a quantity of orthogonal frequency division multiplexing (OFDM) symbols in the uplink transmission time-frequency resource; and sending, by the terminal, the uplink signal to the network side device. During implementation of the uplink transmission method provided in this application, grant free transmission solutions are provided for different uplink transmission time-frequency resources, to effectively improve communication performance.

11 Claims, 7 Drawing Sheets

(51) Int. Cl.
*H04L 27/26* (2006.01)
*H04W 72/12* (2009.01)

(52) U.S. Cl.
CPC ....... *H04L 27/2605* (2013.01); *H04W 72/048* (2013.01); *H04W 72/1268* (2013.01)

(56) References Cited

U.S. PATENT DOCUMENTS

2017/0223695 A1* 8/2017 Kwak ................. H04L 27/2613
2018/0146474 A1 5/2018 Luo et al.

FOREIGN PATENT DOCUMENTS

| CN | 107124383 A | 9/2017 |
| WO | 2016048027 A2 | 3/2016 |
| WO | 2017/000291 A1 | 1/2017 |

OTHER PUBLICATIONS

Huawei Hisilicon:"Overview of UL URLLC Support in NR", 3GPP Draft; R1-1811220, Nov. 13, 2016, XP051175201, 8 pages.
Huawei et al: "Support of URLLC in UL", 3GPP Draft; R1-1610737, Oct. 18, 2016, XP051160226, 9 pages.
ETRI:"Discussion on the slot structure in time domain", 3GPP DRAFT;R1-1609393, vol. Ran WG1, No. Lisbon, Portugal; Oct. 10, 2016-Oct. 14, 2016, Oct. 9, 2016, XP051149436, 4 pages.
Huawei et al.,"Grant-free transmission scheme for UL URLLC",3GPP TSG Ran WG1 Meeting #87 R1-1611689,Reno, Nevada, US, Nov. 14-18, 2016,total 9 pages.
Lenovo,"Uplink Grant-free Access for 5G mMTC",3GPP TSG Ran WG1 Meeting #86bis R1-1609398,Lisbon, Portugal, Oct. 15, 2016,total 4 pages.

* cited by examiner (a) Downlink-only  (b) Uplink-only  (c) Downlink in the majority  (c) Uplink in the majority

UPLINK TRANSMISSION METHOD, TERMINAL, AND NETWORK SIDE DEVICE

CROSS-REFERENCE TO RELATED APPLICATIONS

This application is a continuation of International Application No. PCT/CN2017/115662, filed on Dec. 12, 2017, which claims priority to Chinese Patent Application No. 201710011353.5 filed on Jan. 6, 2017. The disclosures of which are hereby incorporated by reference in their entireties.

TECHNICAL FIELD

This application relates to the field of wireless communications technologies, and in particular, to an uplink transmission method, a terminal, and a network side device.

BACKGROUND

In a wireless cellular network such as a Long Term Evolution (LTE) system, before sending an uplink signal, a terminal first needs to establish a radio resource control (RRC) connection to a base station to enter a radio resource control connected mode, and then sends a scheduling request (SR) to the base station. If the base station allows the terminal to send the uplink signal, the base station sends a grant instruction to the terminal. After receiving the grant instruction, the terminal can send the uplink signal to the base station based on an instruction requirement. Such uplink signal sending method is referred to as granted transmission.

The granted transmission has two disadvantages. One disadvantage is that a latency is relatively large, and the latency herein is a latency from a moment at which the terminal determines that an uplink signal needs to be sent to a moment at which the terminal sends data through an air interface. The other disadvantage is that when there are a very large quantity of terminals that need to send uplink signals in a specific period of time, a very large quantity of uplink and downlink control channel resources are consumed to send scheduling requests and grants, and consequently, a proportion of control overheads to total network overheads (such as power and air interface resources) is relatively high. When all services of the terminals are small data packet services, this disadvantage of the granted transmission is particularly apparent.

A basic idea of grant free transmission is that the data is "being immediately sent after being received". In other words, when determining that an uplink signal needs to be sent, the terminal directly sends data to the base station after performing specific processing on the data, without a process of sending an uplink scheduling request and waiting to receive a grant from the base station. Compared with a granted transmission solution with scheduling performed by the base station, grant free transmission does not necessarily include the process of sending an uplink scheduling request and waiting to receive a grant from the base station. Therefore, a transmission latency can be shortened, thereby meeting a latency requirement.

SUMMARY

Embodiments are disclosed for an uplink transmission method, a terminal, and a network side device.

There are different forms of uplink transmission time-frequency resources allocated by the network side device to the terminal, for example, downlink-only time-frequency resources, uplink-only time-frequency resources, time-frequency resources including downlink time-frequency resources in the majority, and time-frequency resources including uplink time-frequency resources in the majority. In this way, the network side device may flexibly allocate resources to the terminal.

To implement grant free transmission on these different uplink transmission time-frequency resources, according to an aspect, an uplink transmission method performed by a terminal includes:

preconfiguring, by a network side device, an uplink transmission time-frequency resource for a terminal, and locally storing, by the terminal, the uplink transmission time-frequency resource; and when the terminal needs to send an uplink signal, directly determining, by the terminal, the to-be-transmitted uplink signal based on a quantity of orthogonal frequency division multiplexing (OFDM) symbols in the uplink transmission time-frequency resource locally stored in the terminal without requesting the network side device to schedule the uplink transmission time-frequency resource again, and sending the uplink signal to the network side device.

During implementation of the uplink transmission method, a corresponding to-be-transmitted uplink signal is determined for a quantity of occupied OFDM symbols in a different uplink transmission time-frequency resource, and a correspondence between a quantity of OFDM symbols and a to-be-transmitted uplink signal may be locally preconfigured by the terminal or delivered by the network side device to the terminal in different manners. Therefore, grant free transmission solutions are provided for different uplink transmission time-frequency resources, to ensure a grant free transmission effect and effectively improve communication performance.

Uplink signals generated by the terminal have different specific composition and content, and the specific composition and content are determined depending on a correspondence between a quantity of OFDM symbols and a to-be-transmitted uplink signal.

In an implementation, a correspondence between at least one quantity of OFDM symbols and a to-be-transmitted uplink signal is locally preconfigured by the terminal.

In another implementation, the correspondence between at least one quantity of OFDM symbols and a to-be-transmitted uplink signal is delivered by the network side device to the terminal.

The correspondence further includes:

a correspondence between a to-be-transmitted uplink signal and bandwidth that is in the uplink transmission time-frequency resource and that can be used by the terminal to perform uplink transmission; or a correspondence between a to-be-transmitted uplink signal and bandwidth that is in the uplink transmission time-frequency resource and that is used for grant free transmission.

In an implementation in which the network side device delivers the correspondence between at least one quantity of OFDM symbols and a to-be-transmitted uplink signal to the terminal, the correspondence may be delivered to the terminal by using an uplink transmission indication, and the uplink transmission indication is carried in downlink control information, or the correspondence may be sent to the terminal in a form of a table.

In an implementation, a correspondence that is between a quantity of OFDM symbols, bandwidth that can be used by the terminal to perform uplink transmission, and a to-be-transmitted uplink signal and that is locally preconfigured by the terminal or indicated by the network side device is as follows:

when $1 \leq N_{symb}^{UL} \leq N_1$, and $N_{RB}^{GF}$ is less than or equal to a preset value, a corresponding to-be-transmitted uplink signal is a reference signal;

when $1 \leq N_{symb}^{UL} \leq N_1$, and $N_{RB}^{GF}$ is greater than a preset value, corresponding to-be-transmitted uplink signals are a reference signal and a control signal;

when $N_2 \leq N_{symb}^{UL} \leq N_3$, corresponding to-be-transmitted uplink signals are a reference signal and a data signal; or when $N_4 \leq N_{symb}^{UL} \leq N_n$, corresponding to-be-transmitted uplink signals are a reference signal, a control signal, and a data signal, where $N_{symb}^{UL}$ is a quantity of occupied orthogonal frequency division multiplexing (OFDM) symbols in the uplink transmission time-frequency resource, and $N_{RB}^{GF}$ is bandwidth that is in the uplink transmission time-frequency resource and that can be used by the terminal to perform uplink transmission, or $N_{RB}^{GF}$ is bandwidth that is in the uplink transmission time-frequency resource and that can be used for grant free transmission. $N_1$ to $N_n$ are positive integers.

In this embodiment, quantities of OFDM symbols are classified based on a specific value range. A type of quantity of OFDM symbols is corresponding to a type of uplink signal. Therefore, when the terminal locally stores the correspondence, a storage resource may be saved. When delivering the correspondence to the terminal, the network side device classifies quantities of OFDM symbols within a specific value range, so that a signaling resource can be saved.

when $N_{symb}^{UL}=N_5$, corresponding to-be-transmitted uplink signals are a reference signal and a data signal;

when $N_{symb}^{UL}=N_6$, corresponding to-be-transmitted uplink signals are a reference signal and a data signal;

when $N_{symb}^{UL}=N_7$, corresponding to-be-transmitted uplink signals are a reference signal, a control signal, and a data signal;

. . .

when $N_{symb}^{UL}=N_n$, corresponding to-be-transmitted uplink signals are a reference signal, a control signal, and a data signal, where $N_{symb}^{UL}$ is a quantity of occupied orthogonal frequency division multiplexing (OFDM) symbols in the uplink transmission time-frequency resource, and $N_{RB}^{GF}$ is bandwidth that is in the uplink transmission time-frequency resource and that can be used by the terminal to perform uplink transmission, or $N_{RB}^{GF}$ is bandwidth that is in the uplink transmission time-frequency resource and that can be used for grant free transmission. $N_1$ to $N_n$ are positive integers.

In this embodiment, each quantity of OFDM symbols is corresponding to one type of uplink signal, and therefore, the terminal may more accurately find a corresponding uplink signal based on the quantity of OFDM symbols in the uplink transmission time-frequency resource of the terminal.

In another implementation, a table implementation form of the correspondence between a quantity of OFDM symbols, bandwidth that can be used by the terminal to perform uplink transmission, and a to-be-transmitted uplink signal is as follows:

| | A quantity of OFDM symbols per TTI | | | | | | |
|---|---|---|---|---|---|---|---|
| | $N_{symb}^{UL}=1$ $N_{RB}^{GF} \leq 6$ | $N_{symb}^{UL}=1$ $N_{RB}^{GF} > 6$ | $N_{symb}^{UL}=2$ | . . . | $N_{symb}^{UL}=7$ | . . . | $N_{symb}^{UL}=14$ |
| Uplink signal | Reference signal | Reference signal and control signal | Reference signal and data signal | Reference signal and data signal | Reference signal, control signal, and data signal | Reference signal, control signal, and data signal | Reference signal, control signal, and data signal | or

| | A quantity of OFDM symbols per TTI | | | |
|---|---|---|---|---|
| | $N_{symb}^{UL}=1$ $N_{RB}^{GF} \leq 6$ | $N_{symb}^{UL}=1$ $N_{RB}^{GF} > 6$ | $2 \leq N_{symb}^{UL} \leq 6$ | $7 \leq N_{symb}^{UL} \leq 14$ |
| Uplink signal | Reference signal | Reference signal and control signal | Reference signal and data signal | Reference signal, control signal, and data signal |

In another possible implementation, a correspondence between a quantity of OFDM symbols, transmission bandwidth, and a to-be-transmitted uplink signal is as follows:

when $N_{symb}^{UL}=N_1$, and $N_{RB}^{GF}$ is less than or equal to a preset value, a corresponding to-be-transmitted uplink signal is a reference signal;

when $N_{symb}^{UL}=N_1$, and $N_{RB}^{GF}$ is greater than a preset value, corresponding to-be-transmitted uplink signals are a reference signal and a control signal;

when $N_{symb}^{UL}=N_2$, corresponding to-be-transmitted uplink signals are a reference signal and a data signal;

when $N_{symb}^{UL}=N_3$, corresponding to-be-transmitted uplink signals are a reference signal and a data signal;

or

| A quantity of OFDM symbols per TTI $N_{symb}^{UL}=N$ $N_{RB}^{GF}$ is equal to a preset value | |
|---|---|
| Uplink signal type | Type x (Type x) |

The type x indicates that the uplink signal sent by the transceiver includes any one of the following four types of signals:

(1) a reference signal;
(2) a reference signal and a control signal;

(3) a reference signal and a data signal; and (4) a reference signal, a control signal, and a data signal.

According to another aspect, this application provides another uplink transmission method performed by a terminal, and the method includes:

storing, by the terminal, an uplink transmission time-frequency resource allocated by a network side device and an uplink transmission indication;

determining, by the terminal based on a quantity of orthogonal frequency division multiplexing (OFDM) symbols in the uplink transmission time-frequency resource and the uplink transmission indication, an uplink transmission time-frequency resource that can be used by the terminal to perform uplink transmission; and transmitting, by the terminal, an uplink signal on the determined uplink transmission time-frequency resource.

During implementation of this embodiment, because the terminal pre-stores the uplink transmission time-frequency resource and the uplink transmission indication, when the terminal needs to send the uplink signal, the terminal may perform, based on the quantity of OFDM symbols in the uplink transmission time-frequency resource possessed by the terminal, uplink transmission on the uplink transmission time-frequency resource carried in the uplink transmission indication. Therefore, the network side device can perform targeted detection on a specific time-frequency resource, and does not need to receive, through blind detection or the like, an uplink signal sent by the terminal, thereby greatly improving effectiveness of grant free transmission.

In an implementation, the terminal receives the uplink transmission indication sent by the network side device, and the uplink transmission indication carries an ID of an OFDM symbol and an ID of a sub-band that are in the uplink transmission time-frequency resource and that can be used by the terminal to perform uplink transmission; and the terminal transmits the uplink signal on the uplink time-frequency resource corresponding to the ID of the OFDM symbol and the ID of the sub-band.

In this implementation, because the network side device directly indicates, to the terminal, the ID of the OFDM symbol and the ID of the sub-band that are used for uplink transmission, the terminal may directly perform uplink transmission based on the ID of the OFDM symbol and the ID of the sub-band, so that transmission is more orderly and efficient; and the network side device can also perform detection on a corresponding time-frequency resource, thereby improving transmission efficiency of the uplink signal.

In another implementation, the terminal receives the uplink transmission indication sent by the network side device, and the uplink transmission indication carries a quantity of sub-band intervals and a quantity of sub-bands in the uplink transmission time-frequency resource; and the terminal determines, in the uplink transmission time-frequency resource based on the quantity of sub-bands, the quantity of sub-band intervals, and the quantity of OFDM symbols, the ID of the OFDM symbol and the ID of the sub-band that are used for current transmission; and the terminal transmits the uplink signal on the uplink time-frequency resource corresponding to the ID of the OFDM symbol and the ID of the sub-band.

In this implementation, because the network side device sends the quantity of sub-bands and the quantity of sub-band intervals to the terminal and the terminal calculates the ID of the OFDM symbol and the ID of the sub-band, the terminal does not need to rely on an indication of the network side device, so that transmission is more orderly and efficient; and the network side device can also perform detection on a corresponding time-frequency resource, thereby improving transmission efficiency of the uplink signal.

In an implementation, the ID of the OFDM symbol and the ID of the sub-band are determined by using the following formula:

$$b_{ki}=i\cdot K+(n_s+n_k)\bmod K, i=0,1,\ldots,\lfloor N/K\rfloor-1, \text{ where}$$

$b_{ki}$ is an identifier of a sub-band allocated by the network side device to a terminal k, N represents a quantity of sub-bands, K represents a sub-band interval, $n_s$ is the identifier of the OFDM symbol, and $n_k$ is an ID of the terminal k.

In another implementation, the ID of the OFDM symbol and the ID of the sub-band are determined by using the following formula:

$$b_{ki}=i\cdot K+(c(8n_t+n_s)+n_k)\bmod K, i=0,1,\ldots,\lfloor N/K\rfloor-1,$$
where $b_{ki}$ is an identifier of a sub-band allocated by the network side device to a terminal k, N represents a quantity of sub-bands, K represents a sub-band interval, $n_s$ is the identifier of the OFDM symbol, $n_k$ is an ID of the terminal k, $n_t$ is a slot number, and $c(\cdot)$ is a pseudo-random sequence whose initial value is a cell ID $N_{ID}^{cell}$.

In the foregoing implementations, the ID of the OFDM symbol and the ID of the sub-band may be calculated by using different formulas, and time-frequency resources corresponding to the ID of the OFDM symbol and the ID of the sub-band are evenly distributed on uplink transmission time-frequency resources allocated by the network side device to the terminal. Therefore, the terminal can transmit the uplink signal in a more efficient and orderly manner, and collision between a plurality of terminals that occurs when grant free transmission is performed can be alleviated. The network side device more efficiently performs signal detection on the time-frequency resource corresponding to the ID of the OFDM symbol and the ID of the sub-band.

According to still another aspect, an embodiment provides an uplink transmission method, performed by a network side device includes:

configuring, by the network side device, an uplink transmission time-frequency resource and an uplink transmission indication for a terminal, where the uplink transmission time-frequency resource includes at least one orthogonal frequency division multiplexing (OFDM) symbol;

sending, by the network side device, an uplink transmission indication to the terminal, where the uplink transmission indication includes a correspondence between at least one quantity of OFDM symbols and a to-be-transmitted uplink signal; and receiving, by the network side device, an uplink signal determined by the terminal according to the uplink transmission indication.

During implementation of this embodiment, because the network side device configures, for the terminal, the correspondence between a quantity of orthogonal frequency division multiplexing (OFDM) symbols in the uplink transmission time-frequency resource and a to-be-transmitted uplink signal, and quantities of occupied OFDM symbols in different uplink transmission time-frequency resources are corresponding to different uplink signals, the terminal may generate a corresponding uplink signal based on the correspondence and the quantity of OFDM symbols in the used uplink transmission time-frequency resource. Therefore, grant free transmission solutions are provided for different uplink transmission time-frequency resources, to ensure a grant free transmission effect and effectively improve communication performance.

According to yet another aspect, an embodiment provides another uplink transmission method performed by a network side device, and the method includes:

configuring, by the network side device, an uplink transmission time-frequency resource for a terminal, where the uplink transmission time-frequency resource includes at least one OFDM symbol;

sending, by the network side device, an uplink transmission indication to the terminal, where the uplink transmission indication is used to indicate a time-frequency resource that is in the uplink transmission time-frequency resource and that can be used by a terminal to perform uplink transmission; and receiving, by the network side device, an uplink signal sent by the terminal on the time-frequency resource that can be used by the terminal to perform uplink transmission.

During implementation of this embodiment, because the network side device preconfigures the uplink transmission time-frequency resource and the uplink transmission indication for the terminal, when the terminal needs to send the uplink signal, the terminal may perform, based on the quantity of OFDM symbols in the uplink transmission time-frequency resource possessed by the terminal, uplink transmission on the uplink transmission time-frequency resource carried in the uplink transmission indication, so that transmission is more orderly; and the network side device can also perform detection on a corresponding time-frequency resource, thereby improving transmission efficiency of the uplink signal.

In an implementation, the uplink transmission indication carries an ID of an OFDM symbol and an ID of a sub-and that can be used by the terminal to perform uplink transmission, and the terminal transmits the uplink signal on the uplink time-frequency resource corresponding to the ID of the OFDM symbol and the ID of the sub-and.

In another implementation, the uplink transmission indication carries a quantity of sub-band intervals and a quantity of sub-bands in the uplink transmission time-frequency resource, and therefore, the terminal determines, in the uplink transmission time-frequency resource based on the quantity of sub-bands, the quantity of sub-band intervals, and the quantity of OFDM symbols in the uplink transmission time-frequency resource, the ID of the OFDM symbol and the ID of the sub-and that can be used by the terminal to perform uplink transmission, and the terminal transmits the uplink signal on the uplink time-frequency resource corresponding to the ID of the OFDM symbol and the ID of the sub-and.

In an implementation, the ID of the OFDM symbol and the ID of the sub-band are determined by using the following formula:

$$b_{ki}=i \cdot K+(n_s+n_k) \bmod K, i=0,1,\ldots,\lfloor N/K \rfloor-1, \text{ where}$$

$b_{ki}$ is an identifier of a sub-band allocated by the network side device to a terminal k, N represents a quantity of sub-bands, K represents a sub-band interval, $n_s$ is the identifier of the OFDM symbol, and $n_k$ is an ID of the terminal k.

In another implementation, the ID of the OFDM symbol and the ID of the sub-band are determined by using the following formula:

$$b_{ki}=i \cdot K+(c(8n_t+n_s)+n_k) \bmod K, i=0,1,\ldots,\lfloor N/K \rfloor-1,$$
where $b_{ki}$ is an identifier of a sub-band allocated by the network side device to a terminal k, N represents a quantity of sub-bands, K represents a sub-band interval, $n_s$ is the identifier of the OFDM symbol, $n_k$ is an ID of the terminal k, $n_t$ is a slot number, and $c(\cdot)$ is a pseudo-random sequence whose initial value is a cell ID $N_{ID}^{cell}$.

An embodiment provides a terminal. The terminal has a function of implementing terminal behavior in the foregoing method design. The terminal may be a D2D (Device-to-Device, device-to-device) terminal, or may be a cellular terminal. The function of the terminal may be implemented by hardware, and the terminal includes a transceiver and a processor. The function of the terminal may alternatively be implemented by executing corresponding software by hardware. The hardware or software includes one or more modules corresponding to the foregoing function. The module may be software and/or hardware.

According to an aspect, an embodiment provides a terminal, and the terminal includes:

a memory, configured to store an uplink transmission time-frequency resource allocated by a network side device to the terminal;

a processor, configured to: when the terminal needs to send an uplink signal, determine the to-be-transmitted uplink signal based on a quantity of orthogonal frequency division multiplexing (OFDM) symbols in the uplink transmission time-frequency resource stored in the memory; and a transceiver, configured to send, to the network side device, the uplink signal determined by the processor.

During implementation by the terminal, a corresponding to-be-transmitted uplink signal is determined for a quantity of occupied OFDM symbols in a different uplink transmission time-frequency resource, and the uplink signal may be locally preconfigured by the terminal or delivered by the network side device to the terminal in different manners. Therefore, grant free transmission solutions are provided for different uplink transmission time-frequency resources, to ensure a grant free transmission effect and effectively improve communication performance.

According to another aspect, an embodiment provides a terminal, and the terminal includes:

a memory, configured to store an uplink transmission time-frequency resource allocated by a network side device and an uplink transmission indication, where the uplink transmission indication is used to indicate a time-frequency resource that is in the uplink transmission time-frequency resource and that can be used by a terminal to perform uplink transmission;

a processor, configured to determine, in the stored uplink transmission time-frequency resource based on the uplink transmission indication and a quantity of orthogonal frequency division multiplexing (OFDM) symbols in the uplink transmission time-frequency resource received by a transceiver, a time-frequency resource that can be used by the terminal to perform uplink transmission; and a transceiver, configured to transmit the uplink signal on the uplink transmission time-frequency resource that is determined by the processor and that can be used by the terminal to perform uplink transmission.

During implementation of this embodiment, because the terminal pre-stores the uplink transmission time-frequency resource and the uplink transmission indication, when the terminal needs to send the uplink signal, the terminal may perform, based on the quantity of OFDM symbols in the uplink transmission time-frequency resource possessed by the terminal, uplink transmission on the uplink transmission time-frequency resource carried in the uplink transmission indication, so that transmission is more orderly; and the network side device can also perform detection on a corresponding time-frequency resource, thereby improving transmission efficiency of the uplink signal.

In an implementation, the uplink transmission indication stored in the memory carries an ID of an OFDM symbol and an ID of a sub-band that can be used by the terminal to perform uplink transmission.

In another implementation, the uplink transmission indication stored in the memory carries a quantity of sub-band intervals and a quantity of sub-bands in the uplink transmission time-frequency resource.

The processor is further configured to determine, in the uplink transmission time-frequency resource based on the quantity of sub-bands, the quantity of sub-band intervals, and the quantity of OFDM symbols in the uplink transmission time-frequency resource stored in the memory, an ID of an OFDM symbol and an ID of a sub-band that can be used by the terminal to perform uplink transmission.

In an implementation, the ID of the OFDM symbol and the ID of the sub-band are determined by using the following formula:

$$b_{ki}=i \cdot K+(n_s+n_k) \bmod K, i=0,1,\ldots,\lfloor N/K \rfloor-1, \text{ where}$$

$b_{ki}$ is an identifier of a sub-band allocated by the network side device to a terminal k, N represents a quantity of sub-bands, K represents a sub-band interval, $n_s$ is the identifier of the OFDM symbol, and $n_k$ is an ID of the terminal k.

In another implementation, the ID of the OFDM symbol and the ID of the sub-band are determined by using the following formula:

$$b_{ki}=i \cdot K+(c(8n_t+n_s)+n_k) \bmod K, i=0,1,\ldots,\lfloor N/K \rfloor-1,$$
where $b_{ki}$ is an identifier of a sub-band allocated by the network side device to a terminal k, N represents a quantity of sub-bands, K represents a sub-band interval, $n_s$ is the identifier of the OFDM symbol, $n_k$ is an ID of the terminal k, $n_t$ is a slot number, and $c(\cdot)$ is a pseudo-random sequence whose initial value is a cell ID $N_{ID}^{cell}$.

An embodiment provides a network side device, and the network side device may be a base station or a control node.

According to an aspect, an embodiment provides a network side device, and the network side device includes:

a processor, used to configure an uplink transmission time-frequency resource for a terminal, where the uplink transmission time-frequency resource includes at least one orthogonal frequency division multiplexing (OFDM) symbol; and a transceiver, configured to: send an uplink transmission indication and the uplink transmission time-frequency resource to the terminal, and receive an uplink signal determined by the terminal according to the uplink transmission indication, where the uplink transmission indication includes a correspondence between at least one quantity of OFDM symbols and a to-be-transmitted uplink signal.

During implementation of this embodiment, because the network side device configures, for the terminal, the correspondence between a quantity of orthogonal frequency division multiplexing (OFDM) symbols in the uplink transmission time-frequency resource and a to-be-transmitted uplink signal, and quantities of occupied OFDM symbols in different uplink transmission time-frequency resources are corresponding to different uplink signals, the terminal may generate a corresponding uplink signal based on the correspondence and the quantity of OFDM symbols in the used uplink transmission time-frequency resource. Therefore, grant free transmission solutions are provided for different uplink transmission time-frequency resources, to ensure a grant free transmission effect and effectively improve communication performance.

According to another aspect, an embodiment provides a network side device, and the network side device includes:

a processor, used to configure an uplink transmission time-frequency resource for a terminal, where the uplink transmission time-frequency resource includes at least one OFDM symbol; and a transceiver, configured to send an uplink transmission indication to the terminal, where the uplink transmission indication is used to indicate a time-frequency resource that is in the uplink transmission time-frequency resource and that can be used by a terminal to perform uplink transmission, where the transceiver is further configured to receive an uplink signal sent by the terminal on the time-frequency resource that can be used by the terminal to perform uplink transmission.

During implementation of this embodiment, because the network side device preconfigures the uplink transmission time-frequency resource and the uplink transmission indication for the terminal, when the terminal needs to send the uplink signal, the terminal may perform, based on the quantity of OFDM symbols in the uplink transmission time-frequency resource possessed by the terminal, uplink transmission on the uplink transmission time-frequency resource carried in the uplink transmission indication, so that transmission is more orderly; and the network side device can also perform detection on a corresponding time-frequency resource, thereby improving transmission efficiency of the uplink signal.

In an implementation, the uplink transmission indication sent by the transceiver to the terminal is an ID of an OFDM symbol and an ID of a sub-band that are in the uplink transmission time-frequency resource and that can be used by the terminal to perform uplink transmission.

In another implementation, the uplink transmission indication sent by the transceiver to the terminal is a quantity of sub-band intervals and a quantity of sub-bands in the uplink transmission time-frequency resource.

In an implementation, the processor is further configured to determine the ID of the OFDM symbol and the ID of the sub-band by using the following formula:

$$b_{ki}=i \cdot K+(n_s+n_k) \bmod K, i=0,1,\ldots,\lfloor N/K \rfloor-1, \text{ where}$$

$b_{ki}$ is an identifier of a sub-band allocated by the network side device to a terminal k, N represents a quantity of sub-bands, K represents a sub-band interval, $n_s$ is the identifier of the OFDM symbol, and $n_k$ is an ID of the terminal k.

In another implementation, the processor is further configured to determine the ID of the OFDM symbol and the ID of the sub-band by using the following formula:

$$b_{ki}=i \cdot K+(c(8n_t+n_s)+n_k) \bmod K, i=0,1,\ldots,\lfloor N/K \rfloor-1,$$
where $b_{ki}$ is an identifier of a sub-band allocated by the network side device to a terminal k, N represents a quantity of sub-bands, K represents a sub-band interval, $n_s$ is the identifier of the OFDM symbol, $n_k$ is an ID of the terminal k, $n_t$ is a slot number, and $c(\cdot)$ is a pseudo-random sequence whose initial value is a cell ID $N_{ID}^{cell}$.

According to another aspect, an embodiment provides a base station, where the base station has a function of implementing base station behavior in the foregoing method design. The function may be implemented by using hardware, or may be implemented by executing corresponding software by hardware. The hardware or software includes one or more modules corresponding to the foregoing function.

In one design, a structure of the base station includes a processor and a transceiver, where the processor is configured to support the base station in performing corresponding functions in the foregoing method. The transceiver is configured to support communication between the base station and the terminal, send information or signaling used in the foregoing method to the terminal, and receive information or an instruction sent by the base station. The base station may further include a memory, and the memory is configured to couple to the processor and store a program instruction and data that are necessary for the base station.

According to still another aspect, an embodiment provides a control node that may include a controller/processor, a memory, and a communications unit. The controller/processor may be configured to coordinate resource management and configuration between a plurality of base stations, and may be configured to perform the method for configuring a time-frequency resource for the terminal that is described in the foregoing embodiment. The memory may be configured to store program code and data of the control node. The communications unit is configured to support communication between the control node and the base station, for example, send information about a configured resource to the base station.

According to yet another aspect, an embodiment provides a communications chip, and the communications chip includes:

a signal transceiver circuit, configured to receive and store an uplink transmission time-frequency resource allocated by a network side device to a terminal;

a memory, configured to store the uplink transmission time-frequency resource received by the signal transceiver circuit; and a processing circuit, configured to: when the terminal needs to send an uplink signal, determine the to-be-transmitted uplink signal based on a quantity of orthogonal frequency division multiplexing (OFDM) symbols in the uplink transmission time-frequency resource stored in the memory, where the signal transceiver circuit is further configured to send, to the network side device, the uplink signal determined by the processing circuit.

In another implementation, an embodiment provides a communications chip, and the communications chip includes:

a signal transceiver circuit, configured to receive an uplink transmission time-frequency resource allocated by a network side device and an uplink transmission indication, where the uplink transmission indication is used to indicate a time-frequency resource that is in the uplink transmission time-frequency resource and that can be used by a terminal to perform uplink transmission;

a memory, configured to store the uplink transmission time-frequency resource and the uplink transmission indication that are received by the signal transceiver circuit; and a processing circuit, configured to: when the terminal needs to send an uplink signal, determine, in the stored uplink transmission time-frequency resource based on the uplink transmission indication received by the signal transceiver circuit and a quantity of orthogonal frequency division multiplexing (OFDM) symbols in the uplink transmission time-frequency resource received by the signal transceiver circuit, a time-frequency resource that can be used by the terminal to perform uplink transmission, where the signal transceiver circuit is further configured to transmit the uplink signal on the uplink transmission time-frequency resource that is determined by the processing circuit and that can be used by the terminal to perform uplink transmission.

According to still another aspect, an embodiment provides a communications system. The system includes the base station and the terminal described in the foregoing aspects. In an implementation, the system may further include the control node in the foregoing embodiments.

According to yet another aspect, an embodiment provides a computer storage medium, configured to store a computer software instruction used by the foregoing base station, where the computer software instruction includes a program designed to execute the foregoing aspects.

According to still yet another aspect, an embodiment provides a computer storage medium, configured to store a computer software instruction used by the foregoing terminal, where the computer software instruction includes a program designed to execute the foregoing aspects.

A further aspect of an embodiment provides a computer readable storage medium. The computer readable storage medium stores an instruction, and when the instruction runs on a computer, the computer performs the methods in the foregoing aspects.

A still further aspect of an embodiment provides a computer program product that includes an instruction. When the instruction runs on a computer, the computer performs the methods in the foregoing aspects.

BRIEF DESCRIPTION OF DRAWINGS

The accompanying drawings in the following description show exemplary embodiments of the present invention.

DESCRIPTION OF EMBODIMENTS

The following describes technical solutions in the disclosed embodiments with reference to the accompanying drawings.

Figure 1:
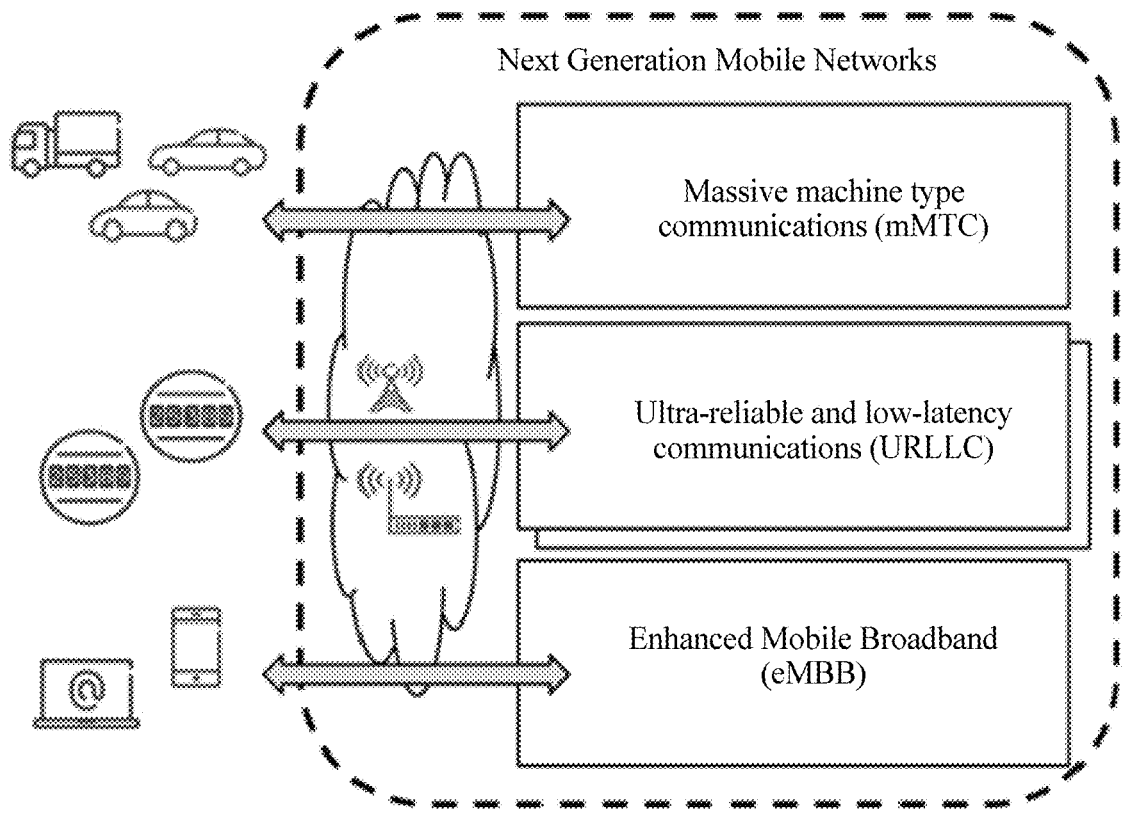
FIG. 1 is a schematic diagram of a future network scenario according to one embodiment.

New communication requirements pose various technical challenges and business mode challenges to an existing network, and need to be met by Next Generation Mobile Networks (Next Generation Mobile Networks, NGMN). As shown in FIG. 1, main mobile network services of the NGMN are classified into three types of scenarios: Enhanced Mobile Broadband (eMBB, Enhanced Mobile Broadband), ultra-reliable and low-latency communications (URLLC, Ultra-reliable and Low-latency Communications), and massive machine type communications (mMTC, Massive Machine Type Communications).

The mMTC covers scenarios that have a high requirement for connection density, such as a smart city and smart agriculture, to meet people's requirement for a digital society. Typical features of the scenarios are as follows: There are a large quantity of connections, that is, a large quantity of terminals; service types are mainly small data packet services; and there is a specific requirement for a low latency.

The URLLC focuses on services that are extremely sensitive to a latency, such as automated driving/assisted driving; for services such as the Internet of Vehicles, unmanned driving, and industrial control, a system capacity is not a major problem of the services, but the services have a very high requirement for a latency and reliability.

In the foregoing two scenarios, grant free transmission is considered as an uplink signal transmission method that is better and more applicable than granted transmission. Compared with a granted transmission solution with scheduling performed by a base station, grant free transmission does not necessarily include a process of sending an uplink scheduling request and waiting to receive a grant from a base station. Therefore, a transmission latency can be greatly shortened, thereby meeting a latency requirement.

For ease of description, in this specification, grant free transmission is denoted as Grant Free in English, and an abbreviation of Grant Free is GF. However, grant free transmission may also be denoted as another term, for example, grantless. A meaning of grant free transmission is not limited thereto in this specification. It may be understood that the grant free transmission herein is not a proper noun, and may also have another name in actual application, but all names do not depart from the essence of this patent application. Grant free transmission is usually performed for an uplink signal, and may be understood as any one or more of the following meanings, but grant free transmission is not limited to these meanings. For example, grant free transmission may alternatively be understood as a combination of some technical features as detailed below.

(1) Grant free transmission may be as follows: A network side device allocates a plurality of transmission resources to a terminal device in advance and informs the terminal device of the transmission resources; when the terminal device needs to transmit an uplink signal, the terminal device selects at least one transmission resource from the plurality of transmission resources allocated by the network side device in advance, and sends the uplink signal by using the selected transmission resource; and the network side device detects, on one or more transmission resources in the plurality of transmission resources allocated in advance, the uplink signal sent by the terminal device. The detection may be blind detection, or may be detection performed based on a specific control field in the uplink signal, or detection performed in another manner.

(2) Grant free transmission may be as follows: A network side device allocates a plurality of transmission resources to a terminal device in advance and informs the terminal device of the transmission resources, so that when the terminal device needs to transmit an uplink signal, the terminal device selects at least one transmission resource from the plurality of transmission resources allocated by the network side device in advance, and sends the uplink signal by using the selected transmission resource.

(3) Grant free transmission may be as follows: Information about a plurality of transmission resources allocated in advance is obtained; and when an uplink signal needs to be transmitted, at least one transmission resource is selected from the plurality of transmission resources, and the uplink signal is sent by using the selected transmission resource. The information may be obtained from a network side device.

(4) Grant free transmission may be a method in which a terminal device can transmit an uplink signal without dynamic scheduling performed by a network side device. The dynamic scheduling may be a scheduling manner in which the network side device indicates, by using signaling, a transmission resource each time the terminal device transmits an uplink signal. Optionally, that the terminal device transmits the uplink signal may be understood as a meaning that two or more terminal devices are allowed to transmit uplink signals on a same time-frequency resource. Optionally, the transmission resource may be a transmission resource in one or more transmission time units following a moment at which the terminal receives the signaling. The transmission time unit may be a minimum time unit in which transmission is performed once, for example, a TTI (Transmission Time Interval), and a value of the transmission time unit may be 1 ms, or may be a preset transmission time unit.

(5) Grant free transmission may be as follows: A terminal device transmits an uplink signal without a grant from a network side device. The grant may be obtained in the following manner: The terminal device sends an uplink scheduling request to the network side device, and after receiving the scheduling request, the network side device sends an uplink grant to the terminal device. The uplink grant indicates an uplink transmission resource allocated to the terminal device.

(6) Grant free transmission may be a contention transmission manner, and may specifically mean that a plurality of terminals simultaneously transmit uplink signals on some or all of same time-frequency resources allocated in advance, without a grant from a network side device.

(7) Grant free transmission may be as follows: A network side device specifies, for a terminal, some uplink transmission time-frequency resources dedicated to uplink signal transmission that does not require a grant.

(8) Grant free transmission may be as follows: A terminal requests a network side device to schedule an uplink transmission time-frequency resource, and after performing uplink transmission by using the uplink transmission time-frequency resource, the terminal retains the uplink transmission time-frequency resource; and then when the terminal needs to perform uplink transmission, the terminal directly uses the uplink transmission time-frequency resource, and does not need to request, each time the terminal performs uplink transmission, the network side device again to schedule an uplink transmission time-frequency resource.

The data may include service data or signaling data.

The blind detection may be understood as a meaning that data likely to arrive is detected without a prediction on whether data is to arrive. Alternatively, the blind detection may be understood as detection performed without an explicit signaling instruction.

The transmission resource may include but is not limited to one or a combination of more of the following resources:

a time domain resource, such as a radio frame, a subframe, and a symbol;

a frequency domain resource, such as a subcarrier and a resource block;

a space domain resource, such as a transmit antenna and a beam;

a code domain resource, such as a sparse code multiple access (English full name: Sparse Code Multiple Access, SCMA for short) codebook, a low density signature (English full name: Low Density Signature, LDS for short) sequence, or CDMA code; and an uplink pilot resource.

The technical solutions provided in this application may be applied to a URLLC scenario and an mMTC scenario, but are not limited to these two scenarios. In any other transmission scenarios that do not require a base station to perform scheduling, the uplink transmission method, the terminal, and the network side device that are provided in this application can be applied.

Figure 2:
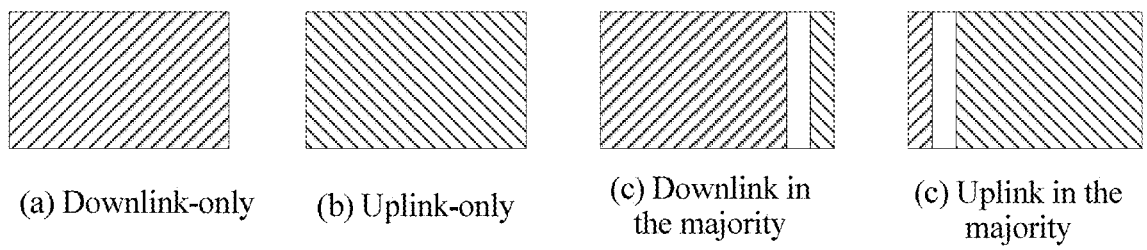
FIG. 2 is a schematic diagram of different subframe formats according one embodiment.

Before the terminal performs grant free transmission, the base station usually needs to specify available uplink transmission resources for the terminal in advance, such as an uplink pilot resource, a time domain resource, and a frequency domain resource. There are a plurality of types of time-frequency resources, as shown in FIG. 2, the time-frequency resources include downlink-only time-frequency resources, uplink-only time-frequency resources, time-frequency resources including downlink time-frequency resources in the majority, and time-frequency resources including uplink time-frequency resources in the majority. Usually, the time-frequency resources may be distinguished based on a quantity $N_{symb}^{UL}$ of orthogonal frequency division multiplexing (Orthogonal Frequency Division Multiplexing, OFDM) symbols used for uplink transmission. It is assumed that one subframe includes 14 OFDM symbols, for a downlink-only subframe, $N_{symb}^{UL}=0$, and for an uplink-only subframe, $N_{symb}^{UL}=14$. When there are a relatively small quantity of symbols in a subframe that are used for uplink transmission, there are a relatively small quantity of corresponding time-frequency resources that can be used for grant free transmission; on the contrary, when there are a relatively large quantity of symbols in a subframe that are used for uplink transmission, there are a relatively large quantity of corresponding time-frequency resources that can be used for grant free transmission.

It should be noted that a granularity at which a resource is scheduled not only includes a subframe (subframe), but also may include a slot (slot) and a mini-slot (mini-slot), and the subframe, the slot, and the mini-slot have different quantities of OFDM symbols. For ease of description, in this embodiment of this application, a subframe format is used to indicate a quantity of OFDM symbols used for uplink transmission in one subframe.

Therefore, for uplink transmission time-frequency resources in different subframe formats, the base station needs to perform flexible GF transmission resource allocation. In this embodiment of this application, a solution is provided based on a communications system shown in FIG. 3, to configure appropriate grant free transmission resources for subframe formats of different uplink transmission time-frequency resources.

Figure 3:
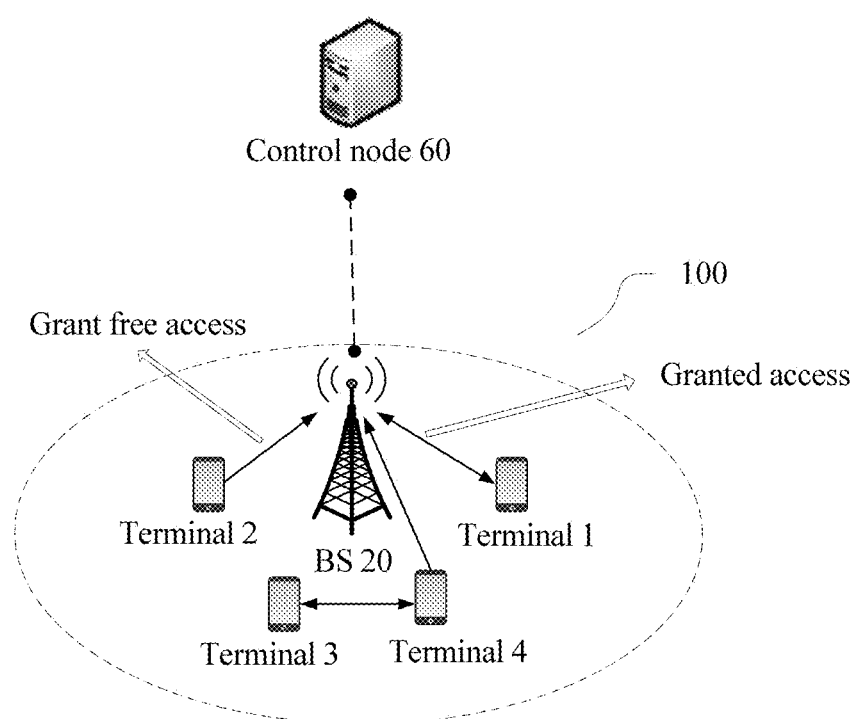
FIG. 3 is an architectural diagram of a communications system according to one embodiment.

As shown in FIG. 3, an embodiment provides a communications system 100. The communications system 100 at least includes at least one base station (base station, BS) 20 and a plurality of terminals, such as a terminal 1, a terminal 2, a terminal 3, and a terminal 4. These terminals may be terminals used for D2D (device-to-device, device-to-device) communication, for example, the terminal 3 and the terminal 4, or may be terminals used for cellular communication, for example, the terminal 1, the terminal 2, and the terminal 4. The cellular communication is communication between the terminal and the base station. Certainly, some terminals may perform cellular communication, and may further serve as D2D communications terminals to perform D2D communication. For example, the terminal 4 may perform both cellular communication and D2D communication.

During cellular communication, the terminal 1 establishes an RRC connection to the BS 20 to enter an RRC connected mode, and then sends an SR request to the BS 20. If the BS 20 allows the terminal 1 to send uplink data, the BS 20 sends a grant instruction to the terminal 1. After receiving the grant instruction, the terminal 1 can send an uplink signal to the BS 20 based on an instruction requirement. Uplink signal transmission between the terminal 1 and the BS 20 is granted transmission.

After the terminal 2 establishes an RRC connection to the BS 20 and enters an RRC connected mode, the terminal 2 generates a to-be-transmitted uplink signal based on a quantity of OFDM symbols in an uplink transmission resource allocated by the BS, and directly sends the uplink signal to the BS 20 without being granted by the BS 20. Uplink signal transmission between the terminal 2 and the BS 20 is grant free transmission.

In this embodiment, a control node 60 connected to the BS 20 may schedule all resources in the system, may configure a resource for the terminal, and may perform resource multiplexing decision, interference coordination, or the like.

In this embodiment of the present invention, the communications system 100 may be systems using various radio access technologies (radio access technology, RAT), for example, a Code Division Multiple Access (code division multiple access, CDMA) system, a Time Division Multiple Access (time division multiple access, TDMA) system, a Frequency Division Multiple Access (frequency division multiple access, FDMA) system, an orthogonal frequency division multiple access (orthogonal frequencydivision multiple access, OFDMA) system, a single carrier frequency division multiple access (single carrier FDMA, SC-FDMA) system, and another system. The terms "system" and "network" can be interchanged with each other. A radio technology such as Universal Terrestrial Radio Access (universal terrestrial radio access, UTRA) or CDMA2000 may be implemented in the CDMA system. UTRA may include a Wideband CDMA (wideband CDMA, WCDMA) technology and another technology obtained by transforming CDMA. CDMA2000 may cover interim standard (interim standard, IS) 2000 (IS-2000), IS-95, and IS-856. A radio technology such as Global System for Mobile Communications (global system for mobile communication, GSM) may be implemented in the TDMA system. A radio technology such as evolved universal terrestrial radio access (evolved UTRA, E-UTRA), Ultra Mobile Broadband (ultra mobile broadband, UMB), IEEE 802.11 (Wi-Fi), IEEE 802.16 (WiMAX), IEEE 802.20, or Flash OFDMA may be implemented in the OFDMA system. UTRA is corresponding to UMTS, and E-UTRA is corresponding to an evolved version of UMTS. A new version of UMTS, namely, E-UTRA, is used for 3GPP Long Term Evolution (long term evolution, LTE) and various versions evolved based on LTE.

In addition, a future-oriented communication technology is further applicable to the communications system 100.

Provided that a communications system that uses a new communication technology performs cellular communication, the technical solutions provided in the embodiments of this application are applicable to the communications system.

A system architecture and a service scenario described in the embodiments of this application are intended to more clearly describe the technical solutions in the embodiments of this application, and do not constitute a limitation on the technical solutions provided in the embodiments of this application. A person of ordinary skill in the art may learn that, with evolution of a network architecture and emergence of a new service scenario, the technical solutions provided in the embodiments of this application are also applicable to similar technical problems.

In the disclosed embodiments, the base station is an apparatus deployed in a radio access network to provide a radio communication function for the terminal. The base station may include different types of macro base stations, micro base stations (also referred to as small cells), relay stations, access points, and the like. Devices with a base station function may have different names in systems that use different radio access technologies. For example, in the LTE system, the device is referred to as an evolved NodeB (evolved NodeB, eNB or eNodeB); and in a 3rd generation (3rd generation, 3G) system, the device is referred to as a NodeB (NodeB) or the like. For ease of description, in the disclosed embodiments, the apparatuses that provide a radio communication function for the terminal are collectively referred to as the base station or the BS.

In the communications system shown in FIG. 3, the control node 60 may be connected to a plurality of base stations, and configure resources for a plurality of D2D terminals and cellular terminals in coverage of the plurality of base stations. For example, the base station may be a NodeB in the UMTS system, and the control node may be a network controller. For another example, the base station may be a small cell, and the control node may be a macro base station that covers the small cell. For still another example, the control node may be a cross-standard coordinated controller or the like in a wireless network, and the base station is a base station in the wireless network. This is not limited in this embodiment of this application.

For ease of description, some technical terms and solutions are described herein.

First, before the terminal needs to transmit an uplink signal in a grant free transmission manner, the terminal locally stores an uplink transmission time-frequency resource allocated by the network side device to the terminal.

The terminal further locally stores a correspondence between a quantity of OFDM symbols and an uplink signal. The terminal may generate a corresponding uplink signal based on a quantity of OFDM symbols in the uplink transmission time-frequency resource, namely, a subframe format of the uplink transmission time-frequency resource; or the terminal determines, based on a subframe format of the uplink transmission time-frequency resource, an uplink transmission time-frequency resource that can be used by the terminal to perform uplink transmission; or the terminal generates a corresponding uplink signal based on a subframe format of the uplink transmission time-frequency resource, and determines an uplink transmission time-frequency resource that can be used by the terminal to perform uplink transmission. Then, the terminal sends the uplink signal on the corresponding uplink transmission time-frequency resource.

For ease of description, in this embodiment, the uplink transmission time-frequency resource that can be used by the terminal to perform uplink transmission is a grant free transmission time-frequency resource, or is referred to as a GF transmission time-frequency resource.

The uplink transmission indication in this embodiment of this application is used to indicate a correspondence between a to-be-transmitted uplink signal and a quantity of OFDM symbols configured by the network side device for the terminal, or is used to indicate the uplink transmission time-frequency resource that can be used by the terminal to perform uplink transmission.

The terminal generates a corresponding to-be-transmitted uplink signal based on the uplink transmission indication and the subframe format of the uplink transmission time-frequency resource.

The terminal determines the GF transmission time-frequency resource based on the uplink transmission indication and the subframe format of the uplink transmission time-frequency resource.

After generating the corresponding uplink signal and determining the GF transmission time-frequency resource based on the uplink transmission indication and the subframe format of the uplink transmission time-frequency resource, the terminal sends the uplink signal on the corresponding GF transmission time-frequency resource.

Regardless of whether the correspondence between an uplink signal and a quantity of OFDM symbols is locally preconfigured by the terminal or is carried in the uplink transmission indication delivered by the network side device, uplink signal types corresponding to different subframe formats or different types of subframe formats are different, and are generally classified into four types: for example, a type 1 (Type 1), a type 2 (Type 2), a type 3 (Type 3), and a type 4 (Type 4).

TABLE 1

| Uplink signal type | |
|---|---|
| Uplink signal type | Specific signal |
| Type 1 (Type 1) | Reference signal |
| Type 2 (Type 2) | Reference signal and control signal |
| Type 3 (Type 3) | Reference signal and data signal |
| Type 4 (Type 4) | Reference signal, control signal, and data signal |

The type 1 (Type 1) indicates that the terminal sends only the reference signal to the network side device. The type 2 (Type 2) indicates that the terminal sends the reference signal and the control signal to the network side device. The type 3 (Type 3) indicates that the terminal sends the reference signal and the data signal to the network side device. The type 4 (Type 4) indicates that the terminal sends the reference signal, the control signal, and the data signal to the network side device.

The reference signal is used to send a scheduling request (SR), and is usually used by the terminal to request more uplink transmission resources from the network side device. The control signal is used to send retransmission information such as a physical resource block (physical resource block, PRB), a buffer status report (Buffer Status Report, BSR), a hybrid automatic repeat request (Hybrid Automatic Repeat reQuest, HARQ) process identification (Identification, ID) number, or a redundancy version number. The data signal is voice, text, video data, or the like transmitted by the terminal to the network side device. Generally, transmission of the data signal requires a relatively large quantity of transmission time-frequency resources, and transmission of the reference signal and the control signal requires a relatively small quantity of transmission time-frequency resources.

That the terminal determines the to-be-transmitted uplink signal by using the locally preconfigured correspondence between a quantity of OFDM symbols (subframe format) and an uplink signal includes the following at least four cases:

Manner 1: The terminal locally preconfigures a plurality of types of uplink signals, and one type of uplink signal is corresponding to one subframe format.

Manner 2: The terminal locally preconfigures a plurality of types of uplink signals, and one type of uplink signal is corresponding to one type of subframe format.

Manner 3: The terminal locally preconfigures one type of uplink signal, and the type of uplink signal is corresponding to one subframe format.

Manner 4: The terminal locally preconfigures one type of uplink signal, and the type of uplink signal is corresponding to one type of subframe format. That the terminal determines a transmission type by using the uplink transmission indication delivered by the network side device to the terminal includes the following at least four cases:

Manner 1: The network side device delivers one uplink transmission indication to the terminal, the uplink transmission indication carries at least one type of uplink signal, and one type of uplink signal is corresponding to one subframe format.

Manner 2: The network side device delivers one uplink transmission indication to the terminal, the uplink transmission indication carries at least one type of uplink signal, and one type of uplink signal is corresponding to one type of subframe format.

Manner 3: The network side device delivers a plurality of uplink transmission indications to the terminal, the uplink transmission indication carries one type of uplink signal, and the type of uplink signal is corresponding to one subframe format.

Manner 4: The network side device delivers a plurality of uplink transmission indications to the terminal, the uplink transmission indication carries one type of uplink signal, and the type of uplink signal is corresponding to one type of subframe format.

A specific form of the manner 1 in which the terminal determines the to-be-transmitted uplink signal by using the locally preconfigured correspondence between a subframe format and an uplink signal or by using the uplink transmission indication delivered by the network side is as follows:

When a first subframe format is as follows: $N_{symb}^{UL}=N_1$, and $N_{RB}^{GF}$ is less than or equal to a preset value, an uplink signal corresponding to the first subframe format is of a type 1, that is, the terminal sends only the reference signal.

When a second subframe format is as follows: $N_{symb}^{UL}=N_1$, and $N_{RB}^{GF}$ is greater than a preset value, an uplink signal corresponding to the second subframe format is of a type 2, that is, the terminal sends the reference signal and the control signal.

When a third subframe format to a seventh subframe format are respectively as follows: $N_{symb}^{UL}=N_2, N_3, N_4, N_5$, or $N_6$, uplink signals corresponding to the subframe formats are of the type 3, that is, the terminal sends the reference signal and the data signal.

When an eighth subframe format to an $(n+1)^{th}$ subframe format are respectively as follows: $N_{symb}^{UL}=N_7, \ldots,$ or $N_n$, uplink signals corresponding to the subframe formats are of the type 4, that is, the terminal sends the reference signal, the control signal, and the data signal.

$N_{symb}^{UL}$ is a quantity of occupied orthogonal frequency division multiplexing (OFDM) symbols in the uplink transmission time-frequency resource, $N_{RB}^{GF}$ is bandwidth that is in the uplink transmission time-frequency resource and that can be used by the terminal to perform uplink transmission, or $N_{RB}^{GF}$ is bandwidth that is in the uplink transmission time-frequency resource and that can be used for grant free transmission. The preset value may be ½ of the entire available uplink transmission bandwidth or another value, and may be a different value configured based on a different case. For example, when the available uplink transmission bandwidth is 12 sub-bands, the preset value may be 6. $N_1$ to $N_n$ are positive integers.

In a specific example, it is assumed that $N_1=1$, $N_2=2, \ldots,$ and $N_n=14$, and the preset value is 6. $N_1=1$ indicates that there is one occupied orthogonal frequency division multiplexing (OFDM) symbol in the uplink transmission time-frequency resource, $N_2=2$ indicates that there are two occupied orthogonal frequency division multiplexing (OFDM) symbols in the uplink transmission time-frequency resource, $\ldots,$ and $N_n=14$ indicates that there are fourteen occupied orthogonal frequency division multiplexing (OFDM) symbols in the uplink transmission time-frequency resource.

When one OFDM symbol in the uplink transmission time-frequency resource is occupied, and $N_{RB}^{GF} \leq 6$, the uplink signal corresponding to the type 1 (Type 1) is sent, namely, the reference signal.

When one OFDM symbol in the uplink transmission time-frequency resource is occupied, and $N_{RB}^{GF} > 6$, the signals corresponding to the type 2 (Type 2) are sent, namely, the reference signal and the control signal.

When two to six OFDM symbols in the uplink transmission time-frequency resource are occupied, the signals corresponding to the type 3 (Type 3) are sent, namely, the reference signal and the data signal.

When seven to fourteen OFDM symbols in the uplink transmission time-frequency resource are occupied, the signals corresponding to the type 4 (Type 4) are sent, namely, the reference signal, the control signal, and the data signal.

Different subframe formats are corresponding to different types of uplink signals. For details, refer to the following Table 2.

TABLE 2

| | A quantity of OFDM symbols per TTI | | | | | | |
| --- | --- | --- | --- | --- | --- | --- | --- |
| | $N_{symb}^{UL}=1$ $N_{RB}^{GF} \leq 6$ | $N_{symb}^{UL}=1$ $N_{RB}^{GF} > 6$ | $N_{symb}^{UL}=2$ | ... | $N_{symb}^{UL}=7$ | ... | $N_{symb}^{UL}=14$ |
| Uplink signal type | Type 1 (Type 1) | Type 2 (Type 2) | Type 3 (Type 3) | Type 3 (Type 3) | Type 4 (Type 4) | Type 4 (Type 4) | Type 4 (Type 4) |

In the manner 1, each subframe format used for uplink transmission is corresponding to one type of uplink signal, and consequently, the terminal can select the uplink signal more flexibly when performing GF transmission.

The manner 2 in which the terminal determines the to-be-transmitted uplink signal by using the locally preconfigured correspondence between a subframe format and an uplink signal or by using the uplink transmission indication delivered by the network side is similar to the manner 1. An uplink signal type classification manner may be slightly different from that in the manner 1. For example, a specific form of the manner 2 is as follows:

When a first type of subframe format is as follows: $1 \leq N_{symb}^{UL} \leq N_1$, and $N_{RB}^{GF}$ is less than or equal to a preset value, an uplink signal corresponding to the first type of subframe format is of a type 1, that is, the terminal sends the reference signal.

When a second type of subframe format is as follows: $1 \leq N_{symb}^{UL} \leq N_1$, and $N_{RB}^{GF}$ is greater than a preset value, uplink signals corresponding to the second type of subframe format are of a type 2, that is, the terminal sends the reference signal and the control signal.

When a third type of subframe format is as follows: $N_2 \leq N_{symb}^{UL} \leq N_3$, uplink signals corresponding to the third type of subframe format are of a type 3, that is, the terminal sends the reference signal and the data signal.

When a fourth type of subframe format is as follows: $N_4 \leq N_{symb}^{UL} \leq N_n$, uplink signals corresponding to the fourth type of subframe format are of a type 4, that is, the terminal sends the reference signal, the control signal, and the data signal.

$N_{symb}^{UL}$ is a quantity of occupied orthogonal frequency division multiplexing (OFDM) symbols in the uplink transmission time-frequency resource, $N_{RB}^{GF}$ is bandwidth that is in the uplink transmission time-frequency resource and that can be used by the terminal to perform uplink transmission, or $N_{RB}^{GF}$ is bandwidth that is in the uplink transmission time-frequency resource and that can be used for grant free transmission, and $N_1$ to $N_n$ are positive integers.

$N_1=1$ indicates that there is one occupied orthogonal frequency division multiplexing (OFDM) symbol in the uplink transmission time-frequency resource, $N_2=2$ indicates that there are two occupied orthogonal frequency division multiplexing (OFDM) symbols in the uplink transmission time-frequency resource, $N_3=6$ indicates that there are six occupied orthogonal frequency division multiplexing (OFDM) symbols in the uplink transmission time-frequency resource, $N_4=7$ indicates that there are seven occupied orthogonal frequency division multiplexing (OFDM) symbols in the uplink transmission time-frequency resource, and $N_n=14$ indicates that there are fourteen occupied orthogonal frequency division multiplexing (OFDM) symbols in the uplink transmission time-frequency resource. That a preset value of $N_{RB}^{GF}$ is 6 is used as an example for description.

When one OFDM symbol in the uplink transmission time-frequency resource is occupied, and $N_{RB}^{GF} \leq 6$, the sent uplink signal is of the type 1 (Type 1), namely, the reference signal.

When one OFDM symbol in the uplink transmission time-frequency resource is occupied, and $N_{RB}^{GF} > 6$, the sent uplink signals are of the type 2 (Type 2), namely, the reference signal and the control signal.

When two to six OFDM symbols in the uplink transmission time-frequency resource are occupied, the sent uplink signals are of the type 3 (Type 3), namely, the reference signal and the data signal.

When seven to fourteen OFDM symbols in the uplink transmission time-frequency resource are occupied, the sent uplink signals are of the type 4 (Type 4), namely, the reference signal, the control signal, and the data signal.

Correspondingly, the foregoing may be expressed by using Table 3.

TABLE 3

| | A quantity of OFDM symbols per TTI | | | |
|---|---|---|---|---|
| | $N_{symb}^{UL} = 1$ $N_{RB}^{GF} \leq 6$ | $N_{symb}^{UL} = 1$ $N_{RB}^{GF} > 6$ | $2 \leq N_{symb}^{UL} \leq 6$ | $7 \leq N_{symb}^{UL} \leq 14$ |
| Uplink signal type | Type 1 (Type 1) | Type 2 (Type 2) | Type 3 (Type 3) | Type 4 (Type 4) |

In the manner 2, one type of uplink signal is configured for each type of subframe format used for uplink transmission, and types of uplink signals corresponding to a same type of subframe format are configured to be the same. Therefore, a signaling resource can be saved.

It should be noted that values of $N_1, N_2, N_3, N_4, \ldots, N_n$ are merely examples. The values of $N_1, N_2, N_3, N_4, \ldots, N_n$ may be set based on a specific need. For example, $N_1$ may alternatively be 2, and $N_2$ may alternatively be 3, or the like.

In the manner 3 in which the terminal determines the to-be-transmitted uplink signal by using the locally preconfigured correspondence between a subframe format and an uplink signal or by using the uplink transmission indication delivered by the network side, the terminal preconfigures only one type of uplink signal corresponding to one subframe format; or the uplink transmission indication delivered by the network side device carries only one type of uplink signal corresponding to one subframe format.

For example, when one OFDM symbol in the uplink transmission time-frequency resource is occupied, and $N_{RB}^{GF} \leq 6$, the sent uplink signal is of the type 1 (Type 1), namely, the reference signal.

Correspondingly, the foregoing may be expressed by using Table 4.

TABLE 4

| | A quantity of OFDM symbols per TTI $N_{symb}^{UL} = 1$ $N_{RB}^{GF} \leq 6$ |
|---|---|
| Uplink signal type | Type 1 (Type 1) |

For another example, when one OFDM symbol in the uplink transmission time-frequency resource is occupied, and $N_{RB}^{GF} > 6$, the sent uplink signals are of the type 2 (Type 2), namely, the reference signal and the control signal.

Correspondingly, the foregoing may be expressed by using Table 5.

TABLE 5

| | A quantity of OFDM symbols per TTI $N_{symb}^{UL} = 1$ $N_{RB}^{GF} > 6$ |
|---|---|
| Uplink signal type | Type 2 (Type 2) |

For still another example, that $N_2=2$ indicates that there are two occupied orthogonal frequency division multiplexing (OFDM) symbols in the uplink transmission time-frequency resource is used as an example. When two OFDM symbols in the uplink transmission time-frequency resource are occupied, the sent uplink signals are of the type 3 (Type 3), namely, the reference signal and the data signal.

Correspondingly, the foregoing may be expressed by using Table 6.

TABLE 6

| | A quantity of OFDM symbols per TTI $N_{symb}^{UL} = 2$ |
|---|---|
| Uplink signal type | Type 3 (Type 3) |

For yet another example, that $N_n=14$ indicates that there are fourteen occupied orthogonal frequency division multiplexing (OFDM) symbols in the uplink transmission time-frequency resource. When fourteen OFDM symbols in the uplink transmission time-frequency resource are occupied, the sent uplink signals are of the type 4 (Type 4), namely, the reference signal, the control signal, and the data signal.

Correspondingly, the foregoing may be expressed by using Table 7.

TABLE 7

| | A quantity of OFDM symbols per TTI $N_{symb}^{UL} = 14$ |
|---|---|
| Uplink signal type | Type 4 (Type 4) |

A case in which $N_{symb}^{UL}$ is another value is deduced from this. Details are not described herein again. In this implementation, the terminal may locally preconfigure only an uplink signal type corresponding to one subframe format of the uplink transmission time-frequency resource. The network side device may send, to the terminal, only the uplink signal type corresponding to the subframe format of the uplink transmission time-frequency resource of the terminal, for example, Table 4, Table 5, Table 6, or Table 7, to save a signaling resource. Alternatively, the network side device may send all the tables to the terminal, so that the terminal can flexibly select the uplink signal type.

In the manner 4 in which the terminal determines the to-be-transmitted uplink signal by using the locally preconfigured correspondence between a subframe format and an uplink signal or by using the uplink transmission indication delivered by the network side, the terminal preconfigures only one type of uplink signal corresponding to one type of subframe format; and the uplink transmission indication delivered by the network side device carries only one type of uplink signal corresponding to one type of subframe format.

For example, when one OFDM symbol in the uplink transmission time-frequency resource is occupied, and $N_{RB}^{GF} \leq 6$, the sent uplink signal is of the type 1 (Type 1), namely, the reference signal.

For another example, when one OFDM symbol in the uplink transmission time-frequency resource is occupied, and $N_{RB}^{GF} > 6$, the sent uplink signals are of the type 2 (Type 2), namely, the reference signal and the control signal.

Correspondingly, the foregoing may be expressed by using Table 8 or Table 9.

TABLE 8

| | A quantity of OFDM symbols per TTI $N_{symb}^{UL} = 1$ $N_{RB}^{GF} \leq 6$ |
|---|---|
| Uplink signal type | Type 1 (Type 1) |

TABLE 9

| | A quantity of OFDM symbols per TTI $N_{symb}^{UL} = 1$ $N_{RB}^{GF} > 6$ |
|---|---|
| Uplink signal type | Type 2 (Type 2) |

That $N_2=2$ and $N_3=6$ indicate that a quantity of occupied orthogonal frequency division multiplexing (OFDM) symbols in the uplink transmission time-frequency resource is greater than or equal to 2 and less than or equal to 6 is used as an example. When two to six OFDM symbols in the uplink transmission time-frequency resource are occupied, the sent uplink signals are of the type 3 (Type 3), namely, the reference signal and the data signal.

Correspondingly, the foregoing may be expressed by using Table 10

TABLE 10

| | A quantity of OFDM symbols per TTI $2 \leq N_{symb}^{UL} \leq 6$ |
|---|---|
| Uplink signal type | Type 3 (Type 3) |

That $N_4=7$ and $N_n=14$ indicate that a quantity of occupied orthogonal frequency division multiplexing (OFDM) symbols in the uplink transmission time-frequency resource is greater than or equal to 7 and less than or equal to 14 is used as an example. When seven to fourteen OFDM symbols in the uplink transmission time-frequency resource are occupied, the sent uplink signals are of the type 4 (Type 4), namely, the reference signal, the control signal, and the data signal.

The foregoing may be expressed by using Table 11.

TABLE 11

| | A quantity of OFDM symbols per TTI $7 \leq N_{symb}^{UL} \leq 14$ |
|---|---|
| Uplink signal type | Type 4 (Type 4) |

A case in which $N_{symb}^{UL}$ is another value is deduced from this. Details are not described herein again. The terminal locally preconfigures only an uplink signal corresponding to one type of subframe format; or the network side device may send, to the terminal, only an uplink signal corresponding to a type of a subframe format of the uplink transmission time-frequency resource of the terminal, for example, Table 9, Table 10, Table 11, or Table 12, to save a signaling resource. Alternatively, the network side device may send all the tables to the terminal, so that the terminal flexibly selects the uplink signal.

Transmission types in the foregoing four manners may be sent to the terminal by using downlink control information (Downlink Control Information, DCI) of a physical downlink control channel (physical downlink control channel, PDCCH). A correspondence between a control message format and a GF transmission type is shown in Table 12.

TABLE 12

| Control message format (Control Format format) | Uplink signal type |
| --- | --- |
| 1A | Type 1 (Type 1) |
| 1B | Type 2 (Type 2) |
| 1C | Type 3 (Type 3) |
| 1D | Type 4 (Type 4) |

Different types of uplink signals are corresponding to different DCI formats, and definitions of some fields are as follows:

1. Format 1A

The DCI format 1A is used for uplink GF transmission, and is used to carry a reference signal in a UL cell. The following information is transmitted in the DCI format 1A:
Cyclic shift for DM RS and OCC index—x bits (Cyclic shift for DM RS and OCC index—x bits)
. . .

2. Format 1B

The DCI format 1B is used for uplink GF transmission, and is used to carry a reference signal and a control signal in a UL cell. The following information is transmitted in the DCI format 1B:
Resource block assignment and hopping resource allocation (Resource block assignment and hopping resource allocation)—x bits
Cyclic shift for DM RS and OCC index—x bits (Cyclic shift for DM RS and OCC index—x bits)
. . .

3. Format 1C

The DCI format 1C is used for uplink GF transmission, and is used to carry a data signal in a UL cell. The following information is transmitted in the DCI format 1C:
Frequency hopping flag—1 bit (Frequency hopping flag—1 bit)
Resource block assignment and hopping resource allocation (Resource block assignment and hopping resource allocation)—x bits
Modulation and coding scheme and redundancy version—x bits (Modulation and coding scheme and redundancy version—x bits)
Cyclic shift for DM RS and OCC index—x bits (Cyclic shift for DM RS and OCC index—x bits)
. . .

4. Format 1D

The DCI format 1D is used for uplink GF transmission, and is used to carry a data signal and a control signal in a UL cell. The following information is transmitted in the DCI format 1D:
Frequency hopping flag-1 bit (Frequency hopping flag-1 bit)
Resource block assignment and hopping resource allocation (Resource block assignment and hopping resource allocation)—x bits
Modulation and coding scheme and redundancy version—x bits (Modulation and coding scheme and redundancy version—x bits)
Cyclic shift for DM RS and OCC index—x bits (Cyclic shift for DM RS and OCC index—x bits)
. . .

The uplink transmission time-frequency resource configured by the network side device for the terminal may include three parts. One part is used to transmit the reference signal, another part is used to transmit the control signal, and the remaining part is used to transmit the data signal. For the foregoing uplink signal types, for example, the type 1 indicates that only the reference signal needs to be transmitted, and therefore, only a time-frequency resource for the reference signal needs to be configured; the type 2 indicates that the reference signal and the control signal need to be transmitted, and therefore, a time-frequency resource for the reference signal and a time-frequency resource for the control signal need to be separately configured; the type 3 indicates that the reference signal and the data signal need to be transmitted, and therefore, a time-frequency resource for the reference signal and a time-frequency resource for the data signal need to be separately configured; and the format 1D indicates that the reference signal, the control signal, and the data signal need to be transmitted, and therefore, a time-frequency resource for the reference signal, a time-frequency resource for the control signal, and a time-frequency resource for the data signal need to be separately configured. Herein, the foregoing is used only as an example, and is not intended to limit an implementation scope of this application. Different uplink signals may be multiplexed through time division, frequency division, or a combination of frequency division and time division.

That the terminal determines, in the uplink transmission resource by using the uplink transmission indication delivered by the network side, the uplink transmission time-frequency resource that can be used by the terminal to perform uplink transmission includes the following at least two cases:

Manner 1: The terminal receives the uplink transmission indication sent by the network side device, and the uplink transmission indication carries an ID of an OFDM symbol and an ID of a sub-band that are in the uplink transmission time-frequency resource and that can be used by the terminal to perform uplink transmission.

Manner 2: The terminal receives the uplink transmission indication sent by the network side device, and the uplink transmission indication carries a quantity of sub-band intervals and a quantity of sub-bands in the uplink transmission time-frequency resource.

The terminal determines, in the uplink transmission time-frequency resource based on the quantity of sub-bands, the quantity of sub-band intervals, and the quantity of OFDM symbols, the ID of the OFDM symbol and the ID of the sub-band that can be used by the terminal to perform uplink transmission.

Details are described below.

In the manner 2, the network side device determines, based on a predefined distribution rule of GF transmission time-frequency resources, an uplink transmission time-frequency resource used for current transmission, namely, the GF transmission time-frequency resource. The GF time-frequency resource is indicated by the identifier of the OFDM symbol (namely, the ID of the OFDM symbol) and the identifier of the sub-band (namely, the ID of the sub-band).

In an implementation, a distribution rule formula for the GF time-frequency resource is as follows:

$$b_{ki}=i \cdot K+(n_s+n_k) \bmod K, i=0,1,\ldots,\lfloor N/K \rfloor-1 \qquad (1)$$

Figure 5:
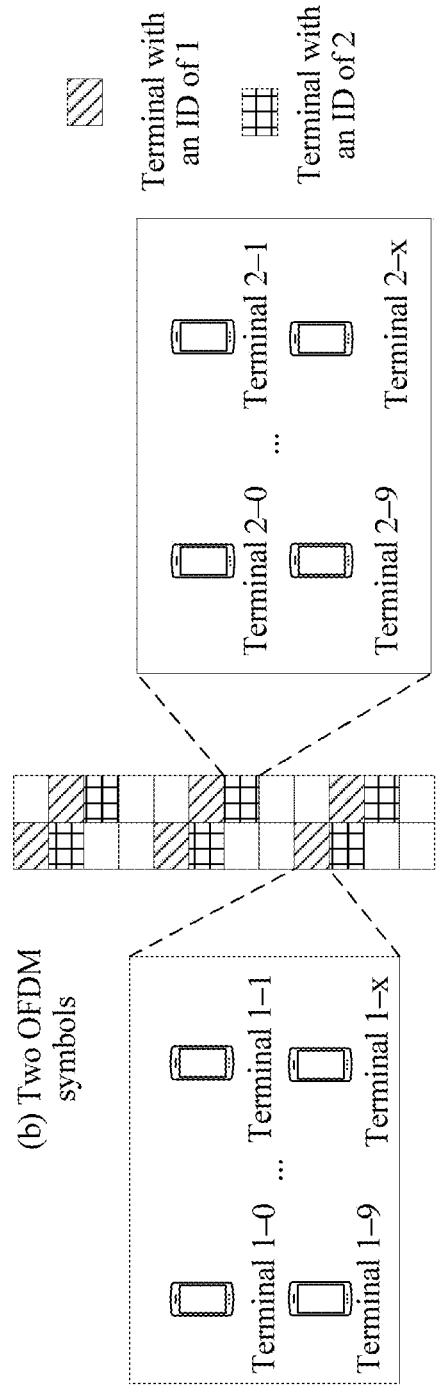
FIG. 5 is another schematic diagram of uplink transmission resource location configuration corresponding to different subframe formats according to one embodiment.

$b_{ki}$ is an identifier of a sub-band allocated by the network side device to a terminal k, N represents a quantity of sub-bands, K represents a sub-band interval, $n_s$ is the identifier of the OFDM symbol, and $n_k$ is an ID of the terminal k. As shown in FIG. 5, N=12, K=4, and based on the formula (1), values of i are 0, 1, 2, and 3.

If a subframe format is a format (a) and $n_s=0$, when the identity ID $n_k$ of the terminal k meets $n_k=1$, based on the foregoing distribution rule formula, the following results are obtained.

An identifier of a sub-band corresponding to a first GF time-frequency resource of a terminal whose ID is 1 is as follows: $b_{11}=0\cdot4+(0+1)\bmod 4=1$.

An identifier of a sub-band corresponding to a second GF time-frequency resource of a terminal whose ID is 1 is as follows: $b_{12}=1\cdot4+(0+1)\bmod 4=5$.

An identifier of a sub-band corresponding to a third GF time-frequency resource of a terminal whose ID is 1 is as follows: $b_{13}=2\cdot4+(0+1)\bmod 4=9$.

When the identity ID $n_k$ of the terminal k meets $n_k=2$, based on the foregoing formula (1), the following results are obtained.

An identifier of a sub-band corresponding to a first GF time-frequency resource of a terminal whose ID is 2 is as follows: $b_{21}=0\cdot4+(0+2)\bmod 4=2$.

An identifier of a sub-band corresponding to a second GF time-frequency resource of a terminal whose ID is 2 is as follows: $b_{22}=1\cdot4+(0+2)\bmod 4=6$.

An identifier of a sub-band corresponding to a third GF time-frequency resource of a terminal whose ID is 2 is as follows: $b_{23}=2\cdot4+(0+2)\bmod 4=10$.

When a subframe format is a format (b) and $n_s=0$, details are as follows:

Calculation manners of identifiers $b_{ki}$ of GF transmission sub-bands that can be used by a terminal 1 with an ID of 1 and a terminal with an ID of 2 are the same as those in the foregoing. Details are not described herein again.

In addition, when an identifier of a symbol meets $n_s=1$, calculation of the identifiers $b_{ki}$ of the GF transmission sub-bands that can be used by the terminal 1 and a terminal 2 is as follows:

When the identity ID $n_k$ of the terminal k meets $n_k=1$, based on the foregoing formula (1), the following results are obtained.

An identifier of a sub-band corresponding to a first GF time-frequency resource of a terminal whose ID is 1 is as follows: $b_{11}=0\cdot4+(1+1)\bmod 4=2$.

An identifier of a sub-band corresponding to a second GF time-frequency resource of a terminal whose ID is 1 is as follows: $b_{12}=1\cdot4+(1+1)\bmod 4=6$.

An identifier of a sub-band corresponding to a third GF time-frequency resource of a terminal whose ID is 1 is as follows: $b_{13}=2\cdot4+(1+1)\bmod 4=10$.

When the identity ID $n_k$ of the terminal k meets $n_k=2$, based on the foregoing distribution rule formula, the following results are obtained.

An identifier of a sub-band corresponding to a first GF time-frequency resource of a terminal whose ID is 2 is as follows: $b_{21}=0\cdot4+(1+2)\bmod 4=3$.

An identifier of a sub-band corresponding to a second GF time-frequency resource of a terminal whose ID is 2 is as follows: $b_{22}=1\cdot4+(1+2)\bmod 4=7$.

An identifier of a sub-band corresponding to a third GF time-frequency resource of a terminal whose ID is 2 is as follows: $b_{23}=2\cdot4+(1+2)\bmod 4=11$.

When a subframe format is a format (c) and $n_s=0, 1,$ or 2 or a subframe format is a format (d) and $n_s=0, 1, 2,$ or 3, calculation processes of identifiers of symbols and identifiers of sub-bands that are corresponding to GF transmission time-frequency resources that can be used by a terminal with an ID of 1 and a terminal with an ID of 2 are the same as those in the foregoing. Details are not described herein again.

In another implementation, a distribution rule formula for the GF time-frequency resource is as follows:

$$b_{ki}=i\cdot K+(c(8n_t+n_s)+n_k)\bmod K, i=0,1,\ldots,\lfloor N/K\rfloor-1 \quad (2)$$

$b_{ki}$ is an identifier of a sub-band allocated by the network side device to a terminal k, N represents a quantity of sub-bands, K represents a sub-band interval, $n_s$ is the identifier of the OFDM symbol, $n_k$ is an ID of the terminal k, $n_t$ is a slot number, and $c(\cdot)$ is a pseudo-random sequence whose initial value is a cell ID $N_{ID}^{cell}$.

A main difference between the formula (2) and the formula (1) is that random frequency hopping at a cell level is added, a calculation principle of the formula (2) is similar to that of the formula (1). Details are not described herein again.

Manner 2: The uplink transmission indication delivered by the network side device carries only a quantity of symbols, a quantity of sub-bands, and a quantity of sub-band intervals of an uplink transmission time-frequency resource. The terminal calculates, based on the foregoing formula (1) or formula (2), an identifier of a sub-band used to perform uplink transmission on a specific symbol.

A process in which the terminal calculates the identifier of the sub-band is the same as a process in which the network side device calculates the identifier of the sub-band. Details are not described again.

In conclusion, the GF time-frequency resource of the terminal whose ID is 1 is represented as a part with oblique lines in FIG. 5, and the GF time-frequency resource of the terminal whose ID is 2 is represented as a part with grids in FIG. 5.

In the manner 2, the identifier of the OFDM symbol and the identifier of the sub-band that are corresponding to the uplink time-frequency resource that can be used by the terminal to perform uplink transmission are calculated by the network side device in advance, and the identifier of the OFDM symbol and the identifier of the sub-band are sent to the terminal by using the uplink transmission indication; or only some parameter information is sent to the terminal by using the uplink transmission indication, and the terminal calculates, based on the parameter information sent by the network side device, the identifier of the symbol and the identifier of the sub-band that are corresponding to the uplink time-frequency resource that can be used by the terminal to perform uplink transmission. GF time-frequency resources calculated based on a predefined distribution rule of GF time-frequency resources that is provided in this embodiment of this application are evenly distributed, and follow a specific rule, and therefore, collision between different terminals that occurs during GF transmission is reduced.

It should be noted that, in the foregoing embodiment, there is more than one terminal whose ID meets $n_k=1$, and correspondingly, there are a group of terminals whose IDs meet $n_k=1$. Likewise, there are a group of terminals whose IDs meet $n_k=2$.

As shown in FIG. 5, that the subframe format of the uplink transmission time-frequency resource indicates that two OFDM symbols are occupied is used as an example for description. The network side device configures a same GF time-frequency resource for a plurality of terminals whose IDs meet $n_k=1$. The plurality of terminals: a terminal 1-0, a terminal 1-1, a terminal 1-2, . . . , a terminal 1-x may share a GF transmission time-frequency resource (shown in the part with oblique lines) corresponding to an identifier of one symbol and an identifier of one sub-band. The plurality of terminals may be multiplexed on the GF transmission time-frequency resource through time division, frequency division, or both time division and frequency division. Likewise, the network side device configures a same GF transmission time-frequency resource (shown in the part with grids) for a plurality of terminals: a terminal 2-0, a terminal 2-1, a terminal 2-2, . . . , a terminal 2-x whose IDs meet $n_k$=2. Other sub-bands in the two OFDM symbols may be used for uplink transmission, or may be allocated to a terminal in another group for GF transmission.

Figure 6:
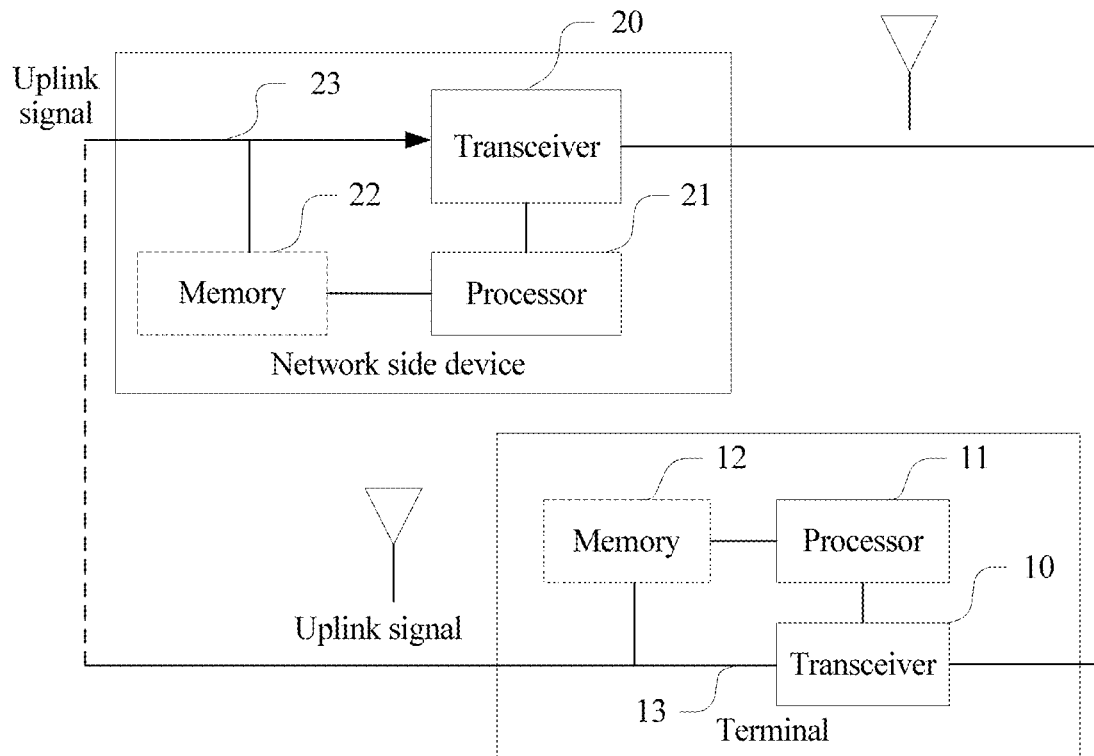
FIG. 6 is a schematic structural diagram of a network side device and a terminal according to one embodiment.

FIG. 6 is a schematic structural diagram of uplink transmission performed by a terminal and a network side device according to an embodiment.

The network side device in this embodiment of this application may include an improved system and device for a peer device in a conventional wireless telecommunications system. Such advanced device or next-generation device may fall within an evolved wireless communication standard (for example, Long Term Evolution (LTE)). For example, the LTE system may include an evolved universal terrestrial radio access network (E-UTRAN) NodeB (eNB), a radio access point, or a similar component, other than a conventional base station. Any such component is referred to as an eNB in this specification, but it should be understood that such component is not necessarily the eNB. The next-generation communications system is to use a "gNB" instead of the eNB in the LTE system.

Specifically, the network side device may be the BS 20 or the control node 60 shown in FIG. 3, and the terminal may be one or more of a terminal 1, a terminal 2, or a terminal 3 shown in FIG. 3.

The terminal provided in this embodiment of this application includes a transceiver 10 and a processor 11. The terminal may further include: a memory 12, where the memory 12 stores a computer executable instruction; a system bus 13, where the system bus 13 connects the processor 11, the transceiver 10, the memory 12, and the like. The network side device includes a transceiver 20 and a processor 21. The network side device may further include: a memory 22, where the memory 22 stores a computer executable instruction; a system bus 23, where the system bus 23 connects the processor 21, the transceiver 20, the memory 22, and the like. The transceiver 20 of the network side device sends an uplink transmission indication to the transceiver 10 of the terminal by using an antenna. The transceiver 10 of the terminal sends an uplink signal to the transceiver 20 of the network side device by using an antenna.

It should be noted that, the processor 11 of the terminal and the processor 21 of the network side device each may be a central processing unit (central processing unit, CPU for short), a network processor (network processor, NP for short), or a combination of the CPU and the NP. The processor may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field-programmable gate array (field-programmable gate array, FPGA for short), generic array logic (generic array logic, GAL for short), or any combination thereof.

The memory 12 of the terminal and the memory 22 of the network side device each may include a volatile memory (volatile memory), such as a random access memory (random access memory, RAM for short); or may further include a non-volatile memory (non-volatile memory), such as a flash memory (flash memory), a hard disk drive (hard disk drive, HDD for short), or a solid-state drive (solid-state drive, SSD for short). The memory may alternatively include a combination of the foregoing types of memories.

The terminal in the disclosed embodiments may include a handheld device, an in-vehicle device, a wearable device, or a calculation device that has a wireless communications function, or another processing device connected to a wireless modem. The terminal may also be referred to as a mobile station (mobile station, MS for short) or a terminal, or the terminal may include a subscriber unit (subscriber unit), a cellular phone (cellular phone), a smartphone (smartphone), a wireless data card, a personal digital assistant (personal digital assistant, PDA) computer, a tablet computer, a wireless modem (modem), a handheld (handheld) device, a laptop computer (laptop computer), a cordless phone (cordless phone), a wireless local loop (wireless local loop, WLL) station, a machine type communication (machine type communication, MTC) terminal, or the like. For ease of description, the devices mentioned above are collectively referred to as the terminal in all the embodiments of this application.

Figure 7:
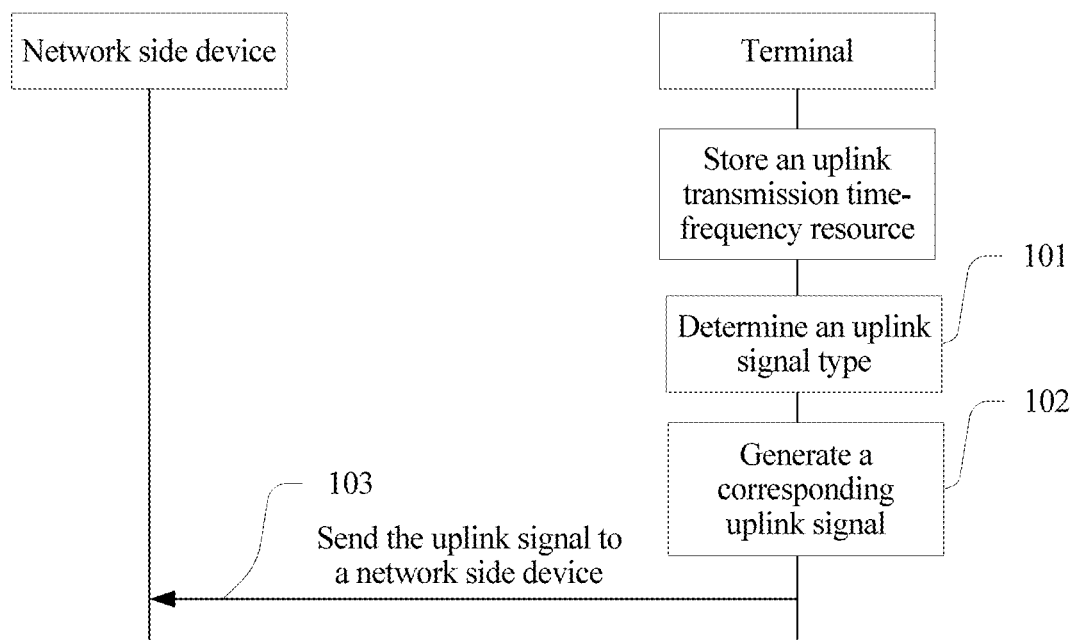
FIG. 7 is a schematic flowchart of Embodiment 1 of an uplink transmission method according to one embodiment.
Figure 8:
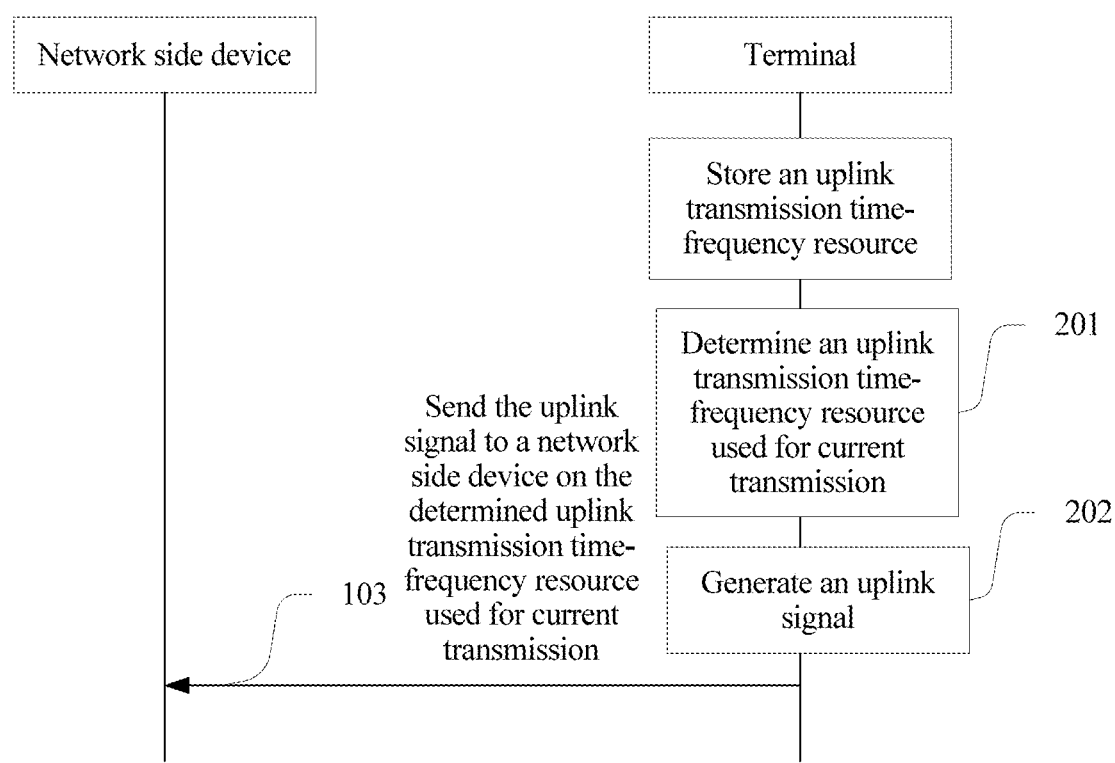
FIG. 8 is a schematic flowchart of Embodiment 2 of an uplink transmission method according to one embodiment.
Figure 9:
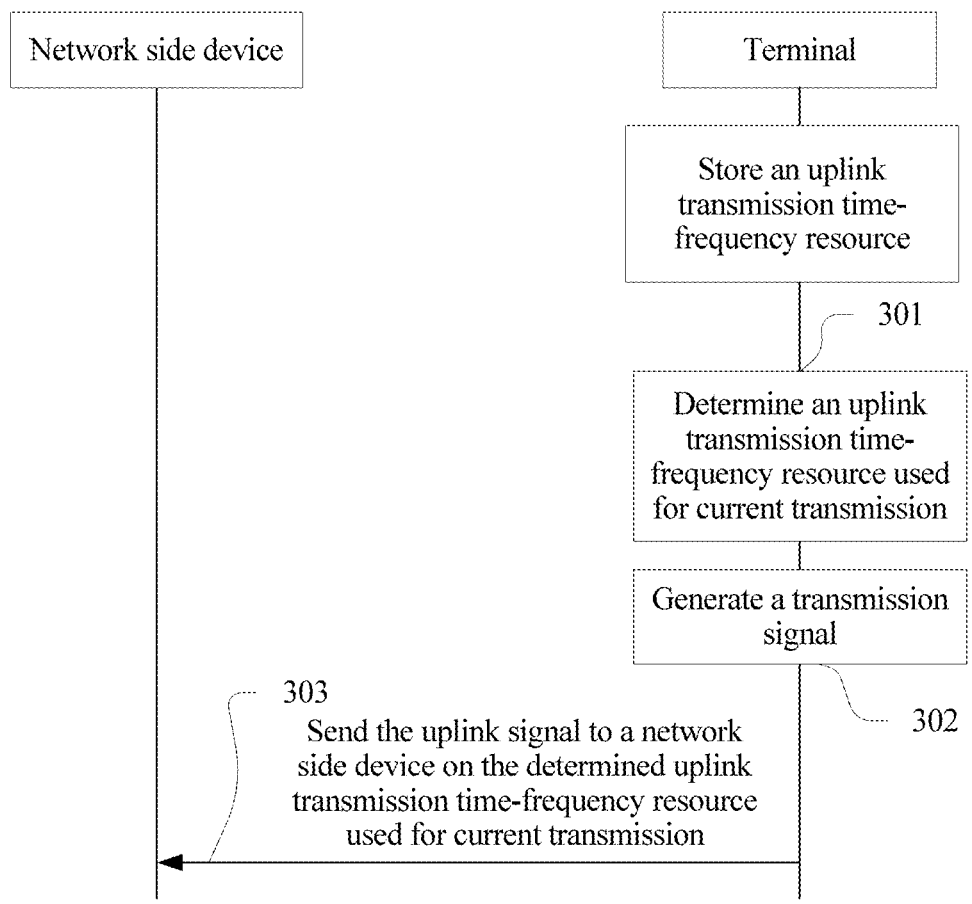
FIG. 9 is a schematic flowchart of Embodiment 3 of an uplink transmission method according to one embodiment.

By combining FIG. 6 with FIG. 7 to FIG. 9, the following describes various implementations of a grant free transmission technology provided in the disclosed embodiments.

Embodiment 1 of the uplink transmission method provided in this application is shown in FIG. 7, and a procedure is as follows:

The terminal stores an uplink transmission time-frequency resource that is configured by the processor 21 of the network side device for the terminal and that is sent to the terminal by using the transceiver 20.

Step 101: When a terminal needs to send an uplink signal, a processor 11 of the terminal determines the to-be-transmitted uplink signal based on a quantity of OFDM symbols (namely, a subframe format) of an uplink transmission time-frequency resource.

As described above, different subframe formats are corresponding to different types of uplink signals. As shown in the foregoing Table 1, there are generally four types of manners: a type 1 indicates that only a reference signal is transmitted, a type 2 indicates that a reference signal and a control signal are transmitted, a type 3 indicates that a reference signal and a data signal are transmitted, and a type 4 indicates that a reference signal, a control signal, and a data signal are transmitted. Each subframe format or each type of subframe format and an uplink signal type corresponding to the subframe format are described in detail in the foregoing, for example, Table 2 to Table 11. In addition, a correspondence between different subframe formats and uplink signal types may be locally preconfigured in the terminal, or may be delivered by the network side device by using the uplink transmission instruction. For details, refer to the foregoing plurality of implementations. Details are not described herein again.

Step 102: The processor 11 of the terminal generates a corresponding uplink signal based on the determined uplink signal type. Details are as follows:

When the uplink signal type determined by the processor 11 is a reference signal, the processor 11 of the terminal generates the reference signal;

when the uplink signal types determined by the processor 11 are a reference signal and a control signal, the processor 11 of the terminal generates the reference signal and the control signal;

when the uplink signal types determined by the processor 11 are a reference signal and a data signal, the processor 11 of the terminal generates the reference signal and the data signal; or when the uplink signal types determined by the processor 11 are a reference signal, a control signal, and a data signal, the processor 11 of the terminal generates the reference signal, the control signal, and the data signal.

The foregoing describes in detail specific roles and functions of three different uplink signals: the reference signal, the control signal, and the data signal. Details are not described herein again.

Step 103: The transceiver 10 of the terminal sends, to the network side device, the uplink signal generated by the processor 11. Therefore, uplink grant free transmission is completed.

During implementation of the uplink transmission method provided in this application, a corresponding to-be-transmitted uplink signal is determined for a quantity of occupied OFDM symbols in a different uplink transmission time-frequency resource, and a correspondence between a quantity of OFDM symbols and a to-be-transmitted uplink signal may be locally preconfigured by the terminal or sent by the network side device to the terminal in different manners. Therefore, grant free transmission solutions are provided for different uplink transmission time-frequency resources, to ensure a grant free transmission effect and effectively improve communication performance. The network side device may receive, by taking measures such as blind detection, the uplink signal sent by the terminal, and perform corresponding processing.

Embodiment 2 of the grant free transmission method provided in this application is shown in FIG. 8. A difference between the method provided in Embodiment 2 and that in Embodiment 1 is that in Embodiment 2, the terminal determines, based on a subframe format of the uplink transmission time-frequency resource, a time-frequency resource that can be used by the terminal to perform uplink transmission. A specific procedure is as follows:

A difference from Embodiment 1 is that in step 201, when the terminal needs to send an uplink signal, the processor 11 of the terminal determines, based on the subframe format of the uplink transmission time-frequency resource, an uplink transmission time-frequency resource that can be used by the terminal to perform uplink transmission.

Figure 4:
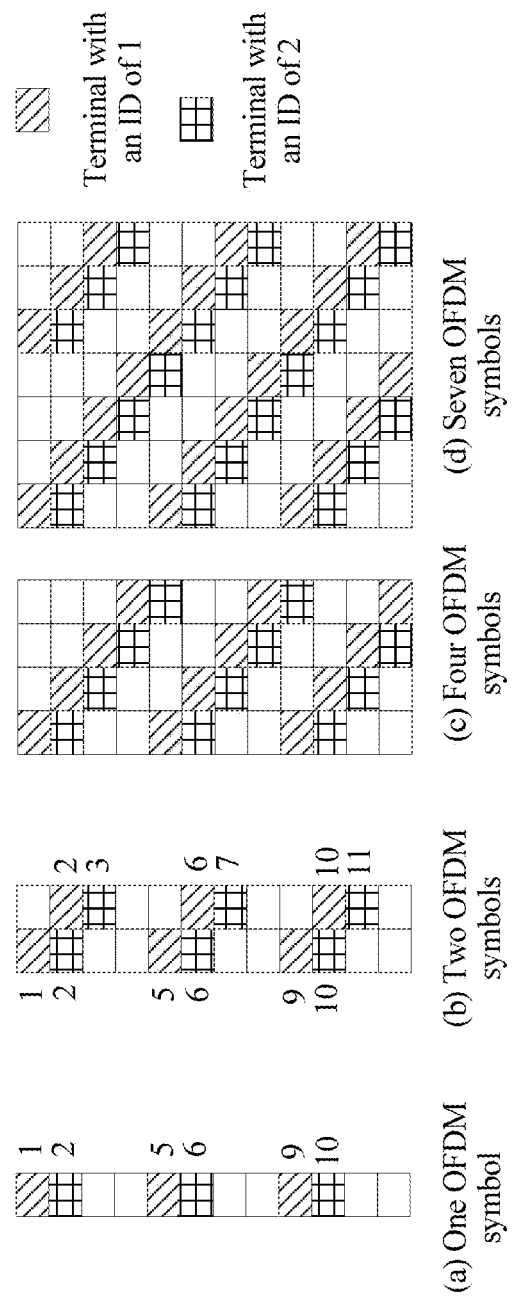
FIG. 4 is a schematic diagram of uplink transmission resource location configuration corresponding to different subframe formats according to one embodiment.

As described above, different subframe formats are corresponding to different uplink transmission time-frequency resources that can be used by the terminal to perform uplink transmission. Specifically, the uplink transmission time-frequency resource may be indicated by an identifier of a sub-band and an identifier of a symbol. Each subframe format or each type of subframe format and the uplink transmission time-frequency resource that is corresponding to the subframe format and that can be used by the terminal to perform uplink transmission are described in detail in FIG. 4 and FIG. 5 and corresponding text. Details are not described herein again.

Step 202: The processor 11 of the terminal generates an uplink signal. It should be noted that in this case, the terminal generates only one or more of a to-be-transmitted reference signal, control signal, or data signal, and a method of generating an uplink signal is not limited to the method in Embodiment 1.

Step 203: The transceiver 10 of the terminal sends, to the network side device on the uplink transmission time-frequency resource that is determined by the processor 11 and that can be used by the terminal to perform uplink transmission, the uplink signal generated by the processor 11. Therefore, uplink grant free transmission is completed.

In Embodiment 2, the terminal determines, based the subframe format, the uplink transmission time-frequency resource that can be used by the terminal to perform uplink transmission, and therefore the network side device can perform targeted detection on a specific time-frequency resource, and does not need to receive, through blind detection or the like, an uplink signal sent by the terminal, thereby greatly improving effectiveness of grant free transmission.

Figure 10:
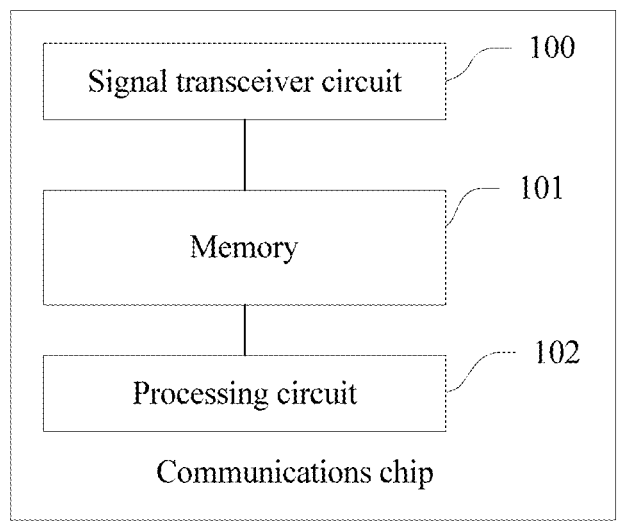
FIG. 10 is a schematic diagram of a functional structure of a terminal according to one embodiment.

Embodiment 3 of the grant free transmission method provided is shown in FIG. 10. The method provided in Embodiment 3 is a combination of that in Embodiment 1 and that in Embodiment 2. The terminal may generate a corresponding uplink signal based on a subframe format, or may determine, based on a subframe format, an uplink transmission time-frequency resource that can be used by the terminal to perform uplink transmission, thereby further improving flexibility and effectiveness of uplink grant free transmission. For details, refer to the steps in FIG. 9. A detailed implementation process of the steps is described in detail in text description corresponding to FIG. 7 and FIG. 8. Details are not described herein again.

The foregoing mainly describes the solutions provided in the disclosed embodiments from a perspective of an overall environment and hardware apparatuses of a communications system, and a method procedure. It can be understood that, to implement the foregoing functions, each network element, such as the terminal, the base station, or the control node, includes a corresponding hardware structure and/or software module for performing each function. The algorithm steps in the examples described with reference to the disclosed embodiments can be implemented by hardware or a combination of hardware and computer software in this application. Whether a function is performed by hardware or hardware driven by computer software depends on particular applications and design constraints of the technical solutions. Different methods may be used to implement the described functions for each particular application, but it should not be considered that the implementation goes beyond the scope of the disclosed embodiments.

In the disclosed embodiments, the communications apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that the module division in the embodiments of this application is an example and is only logical function division. There may be other division manners in actual implementation.

An embodiment of this application further provides a communications chip, and the communications chip includes:

a signal transceiver circuit 100, configured to receive and store an uplink transmission time-frequency resource allocated by a network side device to a terminal;

a memory 101, configured to store the uplink transmission time-frequency resource received by the signal transceiver circuit 100; and a processing circuit 102, configured to: when the terminal needs to send an uplink signal, determine the to-be-transmitted uplink signal based on a quantity of orthogonal frequency division multiplexing (OFDM) symbols in the uplink transmission time-frequency resource stored in the memory 101, where the signal transceiver circuit 100 is further configured to send, to the network side device, the uplink signal determined by the processing circuit 102.

In another implementation, the communications chip includes:

a signal transceiver circuit 100, configured to receive an uplink transmission time-frequency resource allocated by a network side device and an uplink transmission indication, where the uplink transmission indication is used to indicate a time-frequency resource that is in the uplink transmission time-frequency resource and that can be used by a terminal to perform uplink transmission;

a memory 101, configured to store the uplink transmission time-frequency resource and the uplink transmission indication that are received by the signal transceiver circuit 100; and a processing circuit 102, configured to: when the terminal needs to send an uplink signal, determine, in the stored uplink transmission time-frequency resource based on the uplink transmission indication received by the signal transceiver circuit 100 and a quantity of orthogonal frequency division multiplexing (OFDM) symbols in the uplink transmission time-frequency resource received by the signal transceiver circuit 100, a time-frequency resource that can be used by the terminal to perform uplink transmission, where the signal transceiver circuit 100 is further configured to transmit the uplink signal on the uplink transmission time-frequency resource that is determined by the processing circuit 102 and that can be used by the terminal to perform uplink transmission.

In one application, the foregoing functions can be allocated to different modules and implemented according to a requirement, that is, an inner structure of an apparatus is divided into different function modules to implement all or some of the functions described above.

In the disclosed embodiments, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the disclosed embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the disclosed embodiments may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: each medium that can store program code, such as a USB flash drive, a removable hard disk, a ROM, a RAM, a magnetic disk, or an optical disc.

The foregoing detailed description are merely exemplary implementations of the disclosed embodiments, but are not intended to be limiting in scope.

What is claimed is:

1. An uplink transmission method comprising:
    storing, by a terminal, an uplink transmission time-frequency resource allocated by a network side device, wherein the uplink transmission time-frequency resource is preconfigured for the terminal and the uplink transmission time-frequency resource includes a quantity of orthogonal frequency division multiplexing (OFDM) symbols and an uplink transmission indication that is preconfigured and includes a preconfigured correspondence between at least one quantity of OFDM symbols and to-be-transmitted uplink signals and a quantity of sub-band intervals and a quantity of sub-bands that are in the uplink transmission time-frequency resource;
    determining a to-be-transmitted uplink signal based on the quantity of orthogonal frequency division multiplexing (OFDM) symbols in the uplink transmission time-frequency resource when the terminal needs to send an uplink signal, wherein the terminal stores the correspondence between at least one quantity of OFDM symbols and the to-be-transmitted uplink signal and the correspondence further includes a correspondence between the to-be-transmitted uplink signal and bandwidth that is included the uplink transmission time-frequency resource and that is used by the terminal to perform uplink transmission, wherein the terminal receives the uplink transmission indication sent by the network side device that includes the correspondence between at least one quantity of OFDM symbols and the to-be-transmitted uplink signal and the quantity of sub-band intervals and the quantity of sub-bands that are used by the terminal to perform uplink transmission; and
    sending, by the terminal, the uplink signal to the network side device, based on the quantity of sub-bands, the quantity of sub-band intervals, the quantity of OFDM symbols, an ID of an OFDM symbol, and an ID of a sub-band that are in the uplink transmission time-frequency resource and are used by the terminal to perform uplink transmission.

2. The uplink transmission method according to claim 1, wherein the uplink signal comprises any one of:
    (1) a reference signal;
    (2) a reference signal and a control signal;
    (3) a reference signal and a data signal; or
    (4) a reference signal, a control signal, and a data signal.

3. The uplink transmission method according to claim 1, wherein the uplink transmission indication further includes an ID of an OFDM symbol and an ID of a sub-band that are in the uplink transmission time-frequency resource and is used by the terminal to perform uplink transmission; and the sending, by the terminal, the uplink signal to the network side device includes sending, by the terminal, the uplink signal to the network side device on an uplink time-frequency resource corresponding to the ID of the OFDM symbol and the ID of the sub-band.

4. The uplink transmission method according to claim 1, wherein the uplink transmission time-frequency resource is allocated by the network side device to at least two terminals, and the terminal is one of the at least two terminals.

5. The uplink transmission method according to claim 2, wherein the terminal stores a correspondence between a quantity of OFDM symbols, bandwidth used by the terminal to perform uplink transmission, and the to-be-transmitted uplink signal, and wherein the correspondence indicates:

a corresponding to-be-transmitted uplink signal is a reference signal when $1 \leq N_{symb}^{UL} \leq N_1$, and $N_{RB}^{GF}$ is less than or equal to a preset value;

corresponding to-be-transmitted uplink signals are a reference signal and a control signal when $1 \leq N_{symb}^{UL} \leq N_1$, and $N_{RB}^{GF}$ is greater than a preset value;

corresponding to-be-transmitted uplink signals are a reference signal and a data signal when $N_2 \leq N_{symb}^{UL} \leq N_3$; or corresponding to-be-transmitted uplink signals are a reference signal, a control signal, and a data signal when $N_4 \leq N_{symb}^{UL} \leq N_n$ wherein $N_{symb}^{UL}$ is a quantity of occupied orthogonal frequency division multiplexing (OFDM) symbols in the uplink transmission time-frequency resource, $N_{RB}^{GF}$ is transmission bandwidth that is included in the uplink transmission time-frequency resource and used by the terminal to perform uplink transmission, and $N_1$ to $N_n$ are positive integers.

6. A terminal, comprising:

a memory, configured to store an uplink transmission time-frequency resource allocated by a network side device to the terminal, wherein the uplink transmission time-frequency resource is preconfigured for the terminal and the uplink transmission time-frequency resource includes a quantity of orthogonal frequency division multiplexing (OFDM) symbols and an uplink transmission indication that is preconfigured and includes a preconfigured correspondence between at least one quantity of OFDM symbols and to-be-transmitted uplink signals and a quantity of sub-band intervals and a quantity of sub-bands that are in the uplink transmission time-frequency resource;

a processor, configured to determine a to-be-transmitted uplink signal based on the quantity of orthogonal frequency division multiplexing (OFDM) symbols in the uplink transmission time-frequency resource stored in the memory when the terminal needs to send an uplink signal, wherein the terminal stores the correspondence between at least one quantity of OFDM symbols and the to-be-transmitted uplink signal and the correspondence further includes a correspondence between the to-be-transmitted uplink signal and bandwidth that is included the uplink transmission time-frequency resource and that is used by the terminal to perform uplink transmission, wherein the processor receives the uplink transmission indication sent by the network side device that includes the correspondence between at least one quantity of OFDM symbols and the to-be-transmitted uplink signal and the quantity of sub-band intervals and the quantity of sub-bands that are used by the terminal to perform uplink transmission; and a transceiver, configured to send, to the network side device, the uplink signal determined by the processor, wherein the uplink signal is determined based on the quantity of sub-bands, the quantity of sub-band intervals, the quantity of OFDM symbols, an ID of an OFDM symbol, and an ID of a sub-band that are in the uplink transmission time-frequency resource and are used by the terminal to perform uplink transmission.

7. The terminal according to claim 6, wherein the uplink signal sent by the transceiver comprises any one of:

(1) a reference signal;
(2) a reference signal and a control signal;
(3) a reference signal and a data signal; and
(4) a reference signal, a control signal, and a data signal.

8. The terminal according to claim 7, wherein a correspondence that is stored in the memory and that is between a quantity of OFDM symbols, bandwidth used by the terminal to perform uplink transmission, and the to-be-transmitted uplink signal, and wherein the correspondence indicates:

the corresponding to-be-transmitted uplink signal is a reference signal when $1 \leq N_{symb}^{UL} \leq N_1$, and $N_{RB}^{GF}$ is less than or equal to a preset value;

corresponding transmitted uplink signals are a reference signal and a control signal when $1 \leq N_{symb}^{UL} \leq N_1$, and $N_{RB}^{GF}$ is greater than a preset value;

corresponding transmitted uplink signals are a reference signal and a data signal when $N_2 \leq N_{symb}^{UL} \leq N_3$, or corresponding transmitted uplink signals are a reference signal, a control signal, and a data signal when $N_4 \leq N_{symb}^{UL} \leq N_n$, wherein $N_{symb}^{UL}$ is a quantity of occupied orthogonal frequency division multiplexing (OFDM) symbols in the uplink transmission time-frequency resource, $N_{RB}^{GF}$ is bandwidth that is in the uplink transmission time-frequency resource and used by the terminal to perform uplink transmission, and $N_1$ to $N_n$ are positive integers.

9. A network side device, comprising:

a processor to configure an uplink transmission time-frequency resource for a terminal, wherein the uplink transmission time-frequency resource comprises at least one orthogonal frequency division multiplexing (OFDM) symbol, wherein the uplink transmission time-frequency resource is preconfigured for the terminal and the uplink transmission time-frequency resource includes a quantity of orthogonal frequency division multiplexing (OFDM) symbols and an uplink transmission indication that is preconfigured and includes a preconfigured correspondence between at least one quantity of OFDM symbols and to-be-transmitted uplink signals and a quantity of sub-band intervals and a quantity of sub-bands that are in the uplink transmission time-frequency resource; and a transceiver configured to send the uplink transmission indication and the uplink transmission time-frequency resource to the terminal, and receive an uplink signal determined by the terminal according to the uplink transmission indication, wherein the uplink transmission indication comprises the correspondence between at least one quantity of OFDM symbols and a to-be-transmitted uplink signal and the correspondence further includes a correspondence between the to-be-transmitted uplink signal and bandwidth that is included the uplink transmission time-frequency resource and that is used by the terminal to perform uplink transmission, and wherein the uplink transmission indication further includes the quantity of sub-band intervals and the quantity of sub-bands that are in the uplink transmission time-frequency resource used by the terminal to perform uplink transmission and to receive an uplink signal determined by the terminal according to the uplink transmission indication, wherein the uplink signal is determined based on the quantity of sub-bands, the quantity of sub-band intervals, the quantity of OFDM symbols, an ID of an OFDM symbol, and an ID of a sub-band that are in the uplink transmission time-frequency resource and are used by the terminal to perform uplink transmission.

10. The network side device according to claim 9, wherein the uplink signal comprises any one of:
   (1) a reference signal;
   (2) a reference signal and a control signal;
   (3) a reference signal and a data signal; and
   (4) a reference signal, a control signal, and a data signal.

11. The network side device according to claim 9, wherein the uplink transmission indication sent by the transceiver to the terminal further includes an ID of an OFDM symbol and an ID of a sub-band that are in the uplink transmission time-frequency resource and used by the terminal to perform uplink transmission.

* * * * *